United States Patent
Rajput et al.

(10) Patent No.: US 11,528,251 B2
(45) Date of Patent: Dec. 13, 2022

(54) METHODS, SYSTEMS, AND COMPUTER READABLE MEDIA FOR INGRESS MESSAGE RATE LIMITING

(71) Applicant: Oracle International Corporation, Redwood Shores, CA (US)

(72) Inventors: Jay Rajput, Bangalore (IN); Shashikiran Bhalachandra Mahalank, Bangalore (IN); Amit Jain, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/129,487

(22) Filed: Dec. 21, 2020

(65) Prior Publication Data
US 2022/0150212 A1 May 12, 2022

(30) Foreign Application Priority Data
Nov. 6, 2020 (IN) .............................. 202041048552

(51) Int. Cl.
*H04L 61/4511* (2022.01)
*H04L 9/40* (2022.01)
(Continued)

(52) U.S. Cl.
CPC ...... *H04L 61/4511* (2022.05); *H04L 63/0823* (2013.01); *H04L 63/166* (2013.01);
(Continued)

(58) Field of Classification Search
CPC ............. H04L 61/1511; H04L 63/0823; H04L 63/166; H04W 8/26; H04W 80/04; H04W 88/16
See application file for complete search history.

(56) References Cited

U.S. PATENT DOCUMENTS

| | | | |
|---|---|---|---|
| 6,091,958 A | 7/2000 | Bergkvist et al. | |
| 6,151,503 A | 11/2000 | Chavez | |

(Continued)

FOREIGN PATENT DOCUMENTS

| | | | |
|---|---|---|---|
| CN | 101277541 A | 10/2008 | |
| CN | 10135561 A | 1/2009 | |

(Continued)

OTHER PUBLICATIONS

Commonly-Assigned, co-pending U.S. Appl. No. 17/185,934 for "Methods, Systems, and Computer Readable Media for Mitigating Location Tracking and Denial of Service (DoS) Attacks that Utilize Access and Mobility Management Function (AMF) Location Service," (Unpublished, filed Feb. 25, 2021).

(Continued)

*Primary Examiner* — Dung B Huynh
(74) *Attorney, Agent, or Firm* — Jenkins, Wilson, Taylor & Hunt, P.A.

(57) ABSTRACT

Methods, systems, and computer readable media for ingress message rate limiting are disclosed. One method occurs at a first network node of a first network comprises: obtaining, from a transport layer security (TLS) message from a second network node of a second network, an identifier identifying the second network node or the second network; receiving a request message from the second network node or the second network; determining, using the identifier, that an allowed ingress message rate associated with the second network node or the second network has been reached or exceeded; and in response to determining that the allowed ingress message rate associated with the second network node or the second network has been reached or exceeded, performing a rate limiting action.

18 Claims, 7 Drawing Sheets

(51) Int. Cl.
  *H04W 80/04* (2009.01)
  *H04W 8/26* (2009.01)
  *H04W 88/16* (2009.01)

(52) U.S. Cl.
  CPC ............. *H04W 8/26* (2013.01); *H04W 80/04* (2013.01); *H04W 88/16* (2013.01)

(56) References Cited

U.S. PATENT DOCUMENTS

| | | |
|---|---|---|
| 6,292,666 B1 | 9/2001 | Siddiqui et al. |
| 6,308,075 B1 | 10/2001 | Irten et al. |
| 6,343,215 B1 | 1/2002 | Calabrese et al. |
| 6,591,101 B1 | 7/2003 | Shimbori |
| 7,043,754 B2 | 5/2006 | Arnouse |
| 7,567,661 B1 | 7/2009 | Wood et al. |
| 8,045,956 B2 | 10/2011 | Sun et al. |
| 8,145,234 B1 | 3/2012 | Leonard et al. |
| 8,509,074 B1* | 8/2013 | Roberts ............... H04L 43/0894 370/232 |
| 8,615,217 B2 | 12/2013 | Ravishankar et al. |
| 8,879,431 B2 | 11/2014 | Ridel et al. |
| 9,015,808 B1 | 4/2015 | Koller et al. |
| 9,060,263 B1 | 6/2015 | Carames et al. |
| 9,106,428 B2* | 8/2015 | Matthews ............. H04L 49/201 |
| 9,106,769 B2 | 8/2015 | Kanode et al. |
| 9,191,803 B2 | 11/2015 | Patel et al. |
| 9,240,946 B2 | 1/2016 | Cai et al. |
| 9,374,840 B2 | 6/2016 | Monedero Recuero |
| 9,538,335 B1 | 1/2017 | Bank et al. |
| 9,628,994 B1 | 4/2017 | Gunyel et al. |
| 9,912,486 B1* | 3/2018 | Sharifi Mehr ........ H04L 9/3247 |
| 10,009,751 B2 | 6/2018 | Gundavelli et al. |
| 10,021,738 B1 | 7/2018 | Mehta et al. |
| 10,168,413 B2* | 1/2019 | Annamalai ............. H04W 4/02 |
| 10,212,538 B2 | 2/2019 | Russell |
| 10,237,721 B2 | 3/2019 | Gupta et al. |
| 10,306,459 B1 | 5/2019 | Patil et al. |
| 10,470,154 B2 | 11/2019 | Chellamani et al. |
| 10,511,998 B1 | 12/2019 | Vallur |
| 10,616,200 B2 | 4/2020 | Kumar et al. |
| 10,652,850 B2 | 5/2020 | Landais et al. |
| 10,834,045 B2 | 11/2020 | Mahalank et al. |
| 10,834,571 B1 | 11/2020 | Yau et al. |
| 10,931,668 B2 | 2/2021 | Mehta |
| 10,952,063 B2 | 3/2021 | Mehta |
| 10,984,128 B1 | 4/2021 | Hoffer |
| 11,050,788 B2 | 6/2021 | Livanos |
| 11,368,839 B2 | 6/2022 | Targali |
| 2001/0046856 A1 | 11/2001 | McCann |
| 2002/0080752 A1* | 6/2002 | Johansson ........... H04L 61/2517 370/338 |
| 2002/0098856 A1 | 7/2002 | Berg et al. |
| 2002/0181448 A1 | 12/2002 | Uskela et al. |
| 2002/0193127 A1 | 12/2002 | Martschitsch |
| 2003/0087647 A1 | 5/2003 | Hurst |
| 2005/0182968 A1 | 8/2005 | Izatt et al. |
| 2005/0232236 A1 | 10/2005 | Allison et al. |
| 2006/0068762 A1 | 3/2006 | Baldwin et al. |
| 2006/0193258 A1 | 8/2006 | Ballai |
| 2006/0211406 A1 | 9/2006 | Szucs et al. |
| 2006/0242414 A1 | 10/2006 | Corson et al. |
| 2007/0011261 A1 | 1/2007 | Madams et al. |
| 2007/0165527 A1* | 7/2007 | Sultan ................. H04L 47/263 370/230 |
| 2007/0165626 A1* | 7/2007 | Sultan ................. H04L 45/34 370/389 |
| 2007/0174082 A1 | 7/2007 | Singh |
| 2007/0223372 A1* | 9/2007 | Haalen ................. H04L 47/20 370/229 |
| 2007/0248032 A1 | 10/2007 | Vasudevan et al. |
| 2007/0281718 A1 | 12/2007 | Nooren |
| 2008/0004047 A1 | 1/2008 | Hill et al. |
| 2008/0020704 A1 | 1/2008 | Costa |
| 2008/0026778 A1 | 1/2008 | Cai et al. |
| 2008/0045246 A1 | 2/2008 | Murtagh et al. |
| 2008/0051061 A1 | 2/2008 | Takahashi |
| 2008/0125116 A1 | 5/2008 | Jiang |
| 2008/0168540 A1 | 7/2008 | Agarwal et al. |
| 2008/0207181 A1 | 8/2008 | Jiang |
| 2008/0222038 A1 | 9/2008 | Eden |
| 2008/0259798 A1* | 10/2008 | Loh ...................... H04L 47/125 370/235 |
| 2009/0045251 A1 | 2/2009 | Jaiswal et al. |
| 2009/0168719 A1 | 7/2009 | Mercurio |
| 2009/0191915 A1 | 7/2009 | Abramson et al. |
| 2009/0195349 A1 | 8/2009 | Frader-Thompson et al. |
| 2010/0062789 A1 | 3/2010 | Agarwal et al. |
| 2010/0098414 A1* | 4/2010 | Kramer ............. H04B 10/0773 370/235 |
| 2010/0100958 A1 | 4/2010 | Jeremiah |
| 2010/0105355 A1 | 4/2010 | Nooren |
| 2010/0130227 A1 | 5/2010 | Farthofer et al. |
| 2010/0161817 A1 | 6/2010 | Xiao et al. |
| 2010/0223222 A1 | 9/2010 | Zhou et al. |
| 2010/0235911 A1 | 9/2010 | Nooren |
| 2010/0240361 A1 | 9/2010 | Jiang |
| 2010/0313024 A1 | 12/2010 | Weniger et al. |
| 2011/0009085 A1 | 1/2011 | Albanes et al. |
| 2011/0014939 A1 | 1/2011 | Ravishankar et al. |
| 2011/0029655 A1 | 2/2011 | Forbes, Jr. et al. |
| 2011/0063126 A1 | 3/2011 | Kennedy et al. |
| 2011/0124317 A1 | 5/2011 | Joo |
| 2011/0124334 A1 | 5/2011 | Brisebois et al. |
| 2011/0158090 A1 | 6/2011 | Riley et al. |
| 2011/0173122 A1 | 7/2011 | Singhal |
| 2011/0191835 A1 | 8/2011 | Hawkes et al. |
| 2011/0217979 A1 | 9/2011 | Nas |
| 2011/0225091 A1 | 9/2011 | Plastina et al. |
| 2011/0307381 A1 | 12/2011 | Kim et al. |
| 2012/0099715 A1 | 4/2012 | Ravishankar et al. |
| 2012/0115512 A1 | 5/2012 | Grainger et al. |
| 2012/0131121 A1 | 5/2012 | Snyder et al. |
| 2012/0202481 A1 | 8/2012 | Martin |
| 2012/0203663 A1 | 8/2012 | Sinclair et al. |
| 2012/0207015 A1 | 8/2012 | Marsico |
| 2013/0035118 A1 | 2/2013 | Hamano et al. |
| 2013/0102231 A1 | 4/2013 | Joseph et al. |
| 2013/0102310 A1 | 4/2013 | Malonda |
| 2013/0171988 A1 | 7/2013 | Yeung et al. |
| 2013/0275568 A1* | 10/2013 | Nguyen ............. H04L 41/5025 709/223 |
| 2013/0331063 A1 | 12/2013 | Cormier et al. |
| 2014/0195630 A1* | 7/2014 | Malik ..................... G06F 13/28 709/212 |
| 2014/0199961 A1 | 7/2014 | Mohammed et al. |
| 2014/0199996 A1 | 7/2014 | Wang et al. |
| 2014/0259012 A1 | 9/2014 | Nandlall et al. |
| 2014/0280645 A1 | 9/2014 | Shuman et al. |
| 2014/0370922 A1* | 12/2014 | Richards ................ H04W 68/02 455/458 |
| 2014/0378129 A1 | 12/2014 | Jiang et al. |
| 2015/0012415 A1 | 1/2015 | Livne et al. |
| 2015/0038156 A1 | 2/2015 | Kilpatrick, II et al. |
| 2015/0081579 A1* | 3/2015 | Brown ................... H04W 4/02 705/325 |
| 2015/0094060 A1 | 4/2015 | Kouridakis et al. |
| 2015/0121078 A1* | 4/2015 | Fu ....................... H04L 9/3263 713/175 |
| 2015/0188979 A1 | 7/2015 | Almeras et al. |
| 2015/0244486 A1* | 8/2015 | Liang ................... H04L 5/0055 370/337 |
| 2015/0304220 A1* | 10/2015 | Miyao ................ H04L 67/1031 370/230 |
| 2015/0341341 A1* | 11/2015 | Messerges ................ H04L 9/32 713/151 |
| 2015/0350196 A1* | 12/2015 | Toyonaga ........... H04L 63/0876 713/156 |
| 2016/0088461 A1 | 3/2016 | Jiang |
| 2016/0119773 A1 | 4/2016 | Xu et al. |
| 2016/0156647 A1 | 6/2016 | Engel et al. |
| 2016/0165432 A1 | 6/2016 | Dubesset et al. |

(56) References Cited

U.S. PATENT DOCUMENTS

| | | |
|---|---|---|
| 2016/0183117 A1* | 6/2016 | Hsu .................... H04W 72/048 370/235 |
| 2016/0183178 A1 | 6/2016 | Marimuthu |
| 2016/0219043 A1* | 7/2016 | Blanke ................ H04L 63/0823 |
| 2016/0269566 A1 | 9/2016 | Gundamaraju et al. |
| 2016/0292687 A1 | 10/2016 | Kruglick |
| 2016/0337976 A1* | 11/2016 | Wang ................ H04W 52/0251 |
| 2016/0365983 A1* | 12/2016 | Shahabuddin ........ G06F 21/645 |
| 2016/0381699 A1 | 12/2016 | Rubin et al. |
| 2017/0201778 A1* | 7/2017 | Bailey ................ H04N 21/6118 |
| 2017/0244676 A1* | 8/2017 | Edwards ................ H04L 63/08 |
| 2017/0245207 A1 | 8/2017 | Stammers et al. |
| 2017/0257866 A1* | 9/2017 | Chaudhuri .............. H04L 47/11 |
| 2017/0272921 A1 | 9/2017 | Kim et al. |
| 2017/0289048 A1* | 10/2017 | Chao .................. H04L 43/0864 |
| 2017/0295201 A1 | 10/2017 | Peylo et al. |
| 2017/0345006 A1 | 11/2017 | Kohli |
| 2018/0020324 A1 | 1/2018 | Beauford |
| 2018/0109632 A1 | 4/2018 | Stammers et al. |
| 2018/0109953 A1 | 4/2018 | He |
| 2018/0167906 A1 | 6/2018 | Chellamani et al. |
| 2018/0205698 A1 | 7/2018 | Gupta et al. |
| 2018/0270765 A1* | 9/2018 | Wang ................ H04W 52/02 |
| 2018/0288127 A1* | 10/2018 | Zaidi ...................... H04L 63/04 |
| 2018/0288198 A1* | 10/2018 | Pope .................... H04L 41/16 |
| 2018/0310162 A1 | 10/2018 | Kim et al. |
| 2019/0007788 A1 | 1/2019 | Russell |
| 2019/0037484 A1 | 1/2019 | Davies et al. |
| 2019/0044932 A1 | 2/2019 | Kumar et al. |
| 2019/0074982 A1* | 3/2019 | Hughes ................ H04L 9/3242 |
| 2019/0090086 A1* | 3/2019 | Graham ................ H04W 4/021 |
| 2019/0182875 A1 | 6/2019 | Talebi Fard et al. |
| 2019/0253885 A1* | 8/2019 | Bykampadi ............ H04L 63/205 |
| 2019/0306166 A1* | 10/2019 | Konda .................... H04L 9/006 |
| 2019/0342217 A1* | 11/2019 | Mazurek ................ H04L 47/12 |
| 2019/0354709 A1* | 11/2019 | Brinskelle ............ H04L 63/166 |
| 2019/0364460 A1* | 11/2019 | Bogineni .............. H04W 12/06 |
| 2020/0007538 A1 | 1/2020 | Mehta |
| 2020/0036754 A1 | 1/2020 | Livanos |
| 2020/0053044 A1 | 2/2020 | Mahalank et al. |
| 2020/0077260 A1 | 3/2020 | Hancock et al. |
| 2020/0107291 A1 | 4/2020 | Nayak et al. |
| 2020/0145432 A1 | 5/2020 | Verma et al. |
| 2020/0169510 A1* | 5/2020 | Kadosh ................ H04L 47/215 |
| 2020/0187089 A1 | 6/2020 | Meredith et al. |
| 2020/0221541 A1 | 7/2020 | Yan |
| 2020/0259896 A1 | 8/2020 | Sachs et al. |
| 2020/0329363 A1 | 10/2020 | Mehta |
| 2020/0344604 A1 | 10/2020 | He et al. |
| 2021/0022070 A1* | 1/2021 | Letor .................... H04W 40/22 |
| 2021/0111985 A1* | 4/2021 | Mahalank ................ H04L 67/10 |
| 2021/0112012 A1* | 4/2021 | Krishan ............ H04W 28/0289 |
| 2021/0142143 A1* | 5/2021 | Howard .................. G06N 3/006 |
| 2021/0152494 A1* | 5/2021 | Johnsen ............ G06F 15/17331 |
| 2021/0168751 A1 | 6/2021 | Stojanovski et al. |
| 2021/0176177 A1* | 6/2021 | Kubo ................ H04W 28/0289 |
| 2021/0194903 A1* | 6/2021 | Medvedovsky .... H04L 63/1458 |
| 2021/0203636 A1 | 7/2021 | Kumar et al. |
| 2021/0203643 A1 | 7/2021 | Jost et al. |
| 2021/0234706 A1* | 7/2021 | Nair ...................... H04L 9/0825 |
| 2021/0243165 A1 | 8/2021 | Bykampadi et al. |
| 2021/0250186 A1* | 8/2021 | Bykampadi ........ H04W 12/037 |
| 2021/0258824 A1* | 8/2021 | John ................ H04W 28/0289 |
| 2021/0297942 A1* | 9/2021 | S Bykampadi ....... H04W 12/06 |
| 2021/0321303 A1* | 10/2021 | Nair .................... H04M 15/00 |
| 2021/0377138 A1 | 12/2021 | Sun et al. |
| 2021/0377212 A1* | 12/2021 | Holtmanns ............ H04L 63/08 |
| 2021/0399988 A1* | 12/2021 | Labonte .................. H04L 47/20 |
| 2021/0406038 A1* | 12/2021 | Fetzer ................ G06F 9/44505 |
| 2022/0022027 A1 | 1/2022 | Xin et al. |
| 2022/0022040 A1 | 1/2022 | Mahalank et al. |
| 2022/0030413 A1* | 1/2022 | Ben Henda ......... H04L 63/0281 |
| 2022/0038394 A1* | 2/2022 | Anubolu ............ H04L 49/9084 |
| 2022/0052847 A1* | 2/2022 | Gonzalez Cervantes .................... H04L 9/14 |
| 2022/0070674 A1 | 3/2022 | Russell |
| 2022/0104020 A1 | 3/2022 | Rajput |
| 2022/0104112 A1 | 3/2022 | Rajput |
| 2022/0124479 A1 | 4/2022 | Iddya |
| 2022/0124501 A1 | 4/2022 | Bykampadi et al. |
| 2022/0158847 A1 | 5/2022 | Aggarwal et al. |
| 2022/0159445 A1 | 5/2022 | Rajavelu |
| 2022/0174544 A1 | 6/2022 | Taft et al. |
| 2022/0182923 A1* | 6/2022 | Yao ...................... H04W 24/08 |
| 2022/0191694 A1 | 6/2022 | Rajput |
| 2022/0200951 A1 | 6/2022 | Goel et al. |
| 2022/0200966 A1 | 6/2022 | De-Gregorio-Rodriguez et al. |
| 2022/0201489 A1 | 6/2022 | Mahalank et al. |

FOREIGN PATENT DOCUMENTS

| | | |
|---|---|---|
| CN | 101742445 A | 6/2010 |
| CN | 101917698 A | 12/2010 |
| CN | 102656845 A | 9/2012 |
| CN | 103179504 A | 6/2013 |
| CN | 103444212 A | 12/2013 |
| CN | 107800664 A | 3/2018 |
| CN | 110035433 A | 7/2019 |
| CN | 110800322 B | 5/2021 |
| EP | 1 067 492 A2 | 1/2001 |
| EP | 1 906 682 A1 | 4/2008 |
| EP | 2 204 955 A1 | 7/2010 |
| EP | 2 785 125 B1 | 8/2018 |
| EP | 3 493 569 A1 | 6/2019 |
| EP | 3 646 630 B1 | 8/2021 |
| EP | 3 662 630 | 8/2021 |
| ES | 2 548 005 T3 | 10/2015 |
| JP | 7038148 B2 | 3/2022 |
| WO | WO 2001/088790 A1 | 11/2001 |
| WO | WO 2005/091656 A1 | 9/2005 |
| WO | WO 2005/101872 A1 | 10/2005 |
| WO | WO 2007/084503 A2 | 7/2007 |
| WO | WO 2008/053808 A1 | 5/2008 |
| WO | WO-2010/021886 A1 | 2/2010 |
| WO | WO 2010/045646 A2 | 4/2010 |
| WO | WO 2010/105099 A2 | 9/2010 |
| WO | WO 2011/047382 A2 | 4/2011 |
| WO | WO 2016/201990 A1 | 12/2016 |
| WO | WO 2017/082532 A1 | 5/2017 |
| WO | WO 2018/202284 A1 | 11/2018 |
| WO | WO 2019/005287 A1 | 1/2019 |
| WO | WO 2019/027813 A1 | 2/2019 |
| WO | WO 2019/224157 A1 | 11/2019 |
| WO | WO 2020/013889 A1 | 1/2020 |
| WO | WO 2020/033113 A1 | 2/2020 |
| WO | WO 2020/036883 A1 | 2/2020 |
| WO | WO 2020/164763 A1 | 8/2020 |
| WO | WO 2020/179665 A1 | 9/2020 |
| WO | WO 2020/210015 A1 | 10/2020 |
| WO | WO 2020/257018 A1 | 12/2020 |
| WO | WO 2021/138072 A1 | 7/2021 |
| WO | WO 2022/015378 A1 | 1/2022 |
| WO | WO 2022/046176 A1 | 3/2022 |
| WO | WO 2022/066227 | 3/2022 |
| WO | WO 2022/066228 A1 | 3/2022 |
| WO | WO 2022/086596 A1 | 4/2022 |
| WO | WO 2022/098404 A1 | 5/2022 |
| WO | WO 2022/103454 A1 | 5/2022 |
| WO | WO 2022/132315 A1 | 6/2022 |
| WO | WO 2022/132316 A1 | 6/2022 |
| ZA | 201880040478.3 | 4/2022 |

OTHER PUBLICATIONS

Communication under Rule 71 (3) EPC Intention to grant for European Application Serial No. 18 756 018.0 (dated Feb. 24, 2021).

Commonly-Assigned, co-pending U.S. Appl. No. 17/175,260 for "Methods, Systems, and Computer Readable Media for Short Message Delivery Status Report Validation," (Unpublished, filed Feb. 12, 2021).

(56) References Cited

OTHER PUBLICATIONS

"3rd Generation Partnership Project; Technical Specification Group Services and System Aspects; Service requirements for the 5G system; Stage 1 (Release 18)," 3GPP TS 22.261, V18.1.1, pp. 1-85 (Jan. 2021).

"3rd Generation Partnership Project; Technical Specification Group Services and System Aspects; Procedures for the 5G System (5GS); Stage 2 (Release 16)," 3GPP TS 23.502, V16.7.1, pp. 1-603 (Jan. 2021).

Fajardo, V. et al., "Diameter Base Protocol, Internet Engineering Task Force (IETF)," RFC 6733, pp. 1-152 (Oct. 2012).

"3rd Generation Partnership Project; Technical Specification Group Core Network and Terminals; Numbering, addressing and identification; (Release 17)," 3GPP TS 23.003, V17.0.0, pp. 1-142 (Dec. 2020).

"3rd Generation Partnership Project; Technical Specification Group Services and System Aspects; Wireless and wireline convergence access support for the 5G System (5GS) (Release 16)," 3GPP TS 23.316, V16.6.0, pp. 1-83 (Dec. 2020).

"3rd Generation Partnership Project; Technical Specification Group Services and System Aspects; Security architecture and procedures for 5G system (Release 17)," 3GPP TS 33.501, V17.0.0, pp. 1-253 (Dec. 2020).

"3rd Generation Partnership Project; Technical Specification Group Core Network and Terminals; 5G System; Common Data Types for Service Based Interfaces; Stage 3 (Release 17)," 3GPP TS 29.571, V17.0.0, pp. 1-128 (Dec. 2020).

"3rd Generation Partnership Project; Technical Specification Group Core Network and Terminals; 5G System; Public Land Mobile Network (PLMN) Interconnection; Stage 3 (Release 16)," 3GPP TS 29.573, V16.5.0, pp. 1-98 (Dec. 2020).

"3rd Generation Partnership Project; Technical Specification Group Core Network and Terminals; 5G System; Location Management Services; Stage 3 (Release 16)," 3GPP TS 29.572, V16.5.0, pp. 1-77 (Dec. 2020).

"3rd Generation Partnership Project; Technical Specification Group Core Network and Terminals; 5G System; Access and Mobility Management Services; Stage 3 (Release 17)," 3GPP TS 29.518, V17.0.0, pp. 1-298 (Dec. 2020).

"3rd Generation Partnership Project; Technical Specification Group Services and System Aspects; System architecture for the 5G System (5GS); Stage 2 (Release 16)," 3GPP TS 23.501, V16.7.0, pp. 1-450 (Dec. 2020).

SMS Test Numbers: SMS Fake Delivery Receipts, Fake DLR—Tel!—SMS Test Platform and SMS services, Nov. 6, 2020, pp. 1-6, https://telqtele.com/sms-fake-delivery-receipts-fake-dlr/.

Communication of European publication number and information on the application of Article 67(3) EPC for European Application Serial No. 18756018.0 (dated May 13, 2020).

3rd Generation Partnership Project; Technical Specification Group Core Network and Terminals; T8 reference point for Northbound APIs, (Release 15), 3GPP TS 29.122, V15.6.0, pp. 1-300 (Dec. 2019).

DeKok, "The Network Access Identifier," Internet Engineering Task Force (IETF), RFC 7542, pp. 1-30 (May 2015).

Croft, N., "On Forensics: A Silent SMS Attack," Information and Computer Security Architectures (ICSA) Research Group, Department of Computer Science, pp. 1-4, University of Pretoria, South Africa (2012).

Constantin, L., "Remote SMS attack can force mobile phones to send premium-rate text messages: Applications installed by operators on SIM cards can be exploited remotely for SMS fraud and DoS purposes," IDG News Service, Dec. 19, 2011, pp. 1-5, IDG Communications, Inc., United States.

Communication of European publication number and information on the application of Article 67(3) EPC for European Patent Application Serial No. 19730571.7 (dated Apr. 8, 2021).

International Search Report for International Patent Application Serial No. PCT/US2020/065763 (dated Apr. 6, 2021).

First Examination Report for Indian Patent Application Serial No. 201947047367 (dated Mar. 31, 2021).

Notice of Allowance for Chinese Patent Application Serial No. 201880040477.9 (dated Mar. 29, 2021).

Communication under Rule 71 (3) EPC Intention to Grant for European Patent Application Serial No. 18 731 923.1 (dated Mar. 22, 2021).

First Examination Report for Indian Patent Application Serial No. 201947047012 (dated Mar. 18, 2021).

"3rd Generation Partnership Project; Technical Specification Group Services and System Aspects; Security architecture and procedures for 5G System (Release 16)," 3GPP TS 33.501, V16.4.0, pp. 1-249 (Sep. 2020).

"3rd Generation Partnership Project; Technical Specification Group Core Network and Terminals; 5G System; Public Land Mobile Network (PLMN) Interconnection; Stage 3 (Release 16)," 3GPP TS 29.573, V16.4.0, pp. 1-95 (Sep. 2020).

"3rd Generation Partnership Project; Technical Specification Group Core Network and Terminals; 5G System; Network Function Repository Services; Stage 3 (Release 16)," 3GPP TS.29.510, V16.5.0, pp. 1-208 (Sep. 2020).

Dierks et al., "The Transport Layer Security (TLS) Protocol Version 1.2," RFC 5246, pp. 1-104 (Aug. 2008).

Housley et al., "Internet x.509 Public Key Infrastructure Certificate and Certificate Revocation List (CRL) Profile," RFC 3280, pp. 1-129 (Apr. 2002).

Notification Concerning Availability of the Publication of the International Application for International Application No. PCT/US2021/024002 (dated Jan. 20, 2022).

Examination Report for Indian Application Serial No. 202147005810 (dated Jan. 24, 2022).

Examination Report for Indian Application Serial No. 202147001641 (dated Jan. 13, 2022).

Examination Report for Indian Application Serial No. 202047056970 (dated Jan. 13, 2022).

Commonly-Assigned, co-pending U.S. Appl. No. 17/319,023 for "Methods, Systems, and Computer Readable Media for Conducting a Velocity Check for Outbound Subscribers Roaming to Neighboring Countries," (Unpublished, May 12, 2021).

Nokia et al., "3gpp-Sbi-Consumer-Id," 3GPP TSG-CT WG4 Meeting #101e pp. 1-4 (Nov. 3-13, 2020).

Nokia et al., "SBA Network Function certificate profile," 3GPTT TSG-SA WG3 Meeting #98e pp. 1-5 (Mar. 2-6, 2020).

"3rd Generation Partnership Project; Technical Specification Group Services and System Aspects; Security Aspects; Study on security aspects of the 5G Service Based Architecture (SBA) (Release 16)," 3GPP TR 33.855, V1.3.0 pp. 1-52 (Nov. 2018).

Notification of Transmittal of the International Search Report and the Written Opinion of the International Searching Authority, or the Declaration for International Application No. PCT/US2021/042660 (dated Oct. 26, 2021).

Hearing Notice of Indian Application Serial No. 201947047367 (dated Oct. 11, 2021).

First Office Action for Japanese Application Serial No. 2019572174 (dated Sep. 14, 2021).

Notification of Transmittal of the International Search Report and the Written Opinion of the International Searching Authority, or the Declaration for International Application No. PCT/US2021/033030 (dated Aug. 20, 2021).

First Office Action for Chinese Application Serial No. 201880040478.3 (dated Aug. 26, 2021).

Notification Concerning Availability of the Publication of the International Application for International Application No. PCT/US2020/065763 (dated Jul. 8, 2021).

Non-Final Office Action for U.S. Appl. No. 17/099,683 (dated Sep. 20, 2021).

Decision to grant a European patent pursuant to Article 97(1) EPC for European Patent Application Serial No. 18756018.0 (dated Jul. 29, 2021).

Decision to grant a European patent pursuant to Article 97(1) EPC for European Patent Application Serial No. 18731923.1 (dated Jul. 15, 2021).

(56) References Cited

OTHER PUBLICATIONS

Notification of Transmittal of the International Search Report and the Written Opinion of the International Searching Authority, or the Declaration for International Application No. PCT/US2021/029977 (dated Jul. 9, 2021).
Notification of Transmittal of the International Search Report and the Written Opinion of the International Searching Authority, or the Declaration for International Application No. PCT/US2021/029973 (dated Jul. 7, 2021).
Notification of Transmittal of the International Search Report and the Written Opinion of the International Searching Authority, or the Declaration for International Application No. PCT/US2021/024002 (dated Jun. 29, 2021).
Notification of Transmittal of the International Search Report and the Written Opinion of the International Searching Authority, or the Declaration for International Application No. PCT/US2021/024980 (dated Jun. 23, 2021).
Communication of European publication No. and information on the application of Article 67(3) EPC for European Patent Application Serial No. 19710842.6 (dated Apr. 21, 2021).
"3rd Generation Partnership Project; Technical Specification Group Services and System Aspects; Security Aspects; Study on security aspects of the 5G Service based Architecture (SBA) (Release 16)," 3GPP TR 33.855, V16.0.0, pp. 1-104 (Jul. 2020).
"3rd Generation Partnership Project; Technical Specification Group Services and System Aspects; Security Assurance Specification (SCAS) threats and critical assets in 3GPP network product classes (Release 16)," 3GPP TR 33.926, V16.3.0, pp. 1-60 (Mar. 2020).
"New Annex for the SEPP in TR 33.926," 3GPP TSG-SA WG3 Meeting #95-BIS, pp. 1-6 (Jun. 24-28, 2019).
"N32 message anti-spoofing within the Sepp," 3GPP TSG SA WG3 (Security), Meeting #91, pp. 1-2 (Apr. 16-20, 2018).
Commonly-Assigned, co-pending U.S. Appl. No. 17/129,441 for "Methods, Systems, and Computer Readable Media for Mitigating Spoofing Attacks on Security Edge Protection Proxy (SEPP) Inter-Public Land Mobile Network (INTER-PLMN) Forwarding Interface," (Unpublished, filed Dec. 21, 2020).
Commonly-Assigned, co-pending U.S. Appl. No. 17/125,943 for "Methods, Systems, and Computer Readable Media for Mitigating 5G Roaming Attacks for Internet of Things (IoT) Devices Based on Expected User Equipment (UE) Behavior Patterns," (Unpublished, filed Dec. 17, 2020).
Commonly-Assigned, co-pending U.S. Appl. No. 17/123,038 for "Methods, Systems, and Computer Readable Media for Message Validation in Fifth Generation (5G) Communications Networks," (Unpublished, filed Dec. 15, 2020).
"3rd Generation Partnership Project; Technical Specification Group Core Network and Terminals; 5G System; Network Function Repository Services; Stage 3 (Release 17)," 3GPP TS 29.510, V17.0.0, pp. 1-229 (Dec. 2020).
Commonly-Assigned, co-pending U.S. Appl. No. 17/099,683 for "Methods, Systems, and Computer Readable Media for Validating Location Update Messages," (Unpublished, filed Nov. 16, 2020).
Commonly-Assigned, co-pending U.S. Appl. No. 17/095,420 for "Methods, Systems, and Computer Readable Media for Mitigating 5G Roaming Spoofing Attacks," (Unpublished, filed Nov. 11, 2020).
Notice of Allowance and Fee(s) Due and Examiner-Initiated Interview Summary for U.S. Appl. No. 16/379,488 (dated Oct. 23, 2020).
Commonly-Assigned, co-pending U.S. Appl. No. 17/076,482 for "Methods, Systems, and Computer Readable Media for Validating a Session Management Function (SMF) Registration Request," (Unpublished, filed Oct. 21, 2020).
Notice of Allowance and Fee(s) Due and Examiner-Initiated Interview Summary for U.S. Appl. No. 16/024,422 (dated Oct. 21, 2020).
"3rd Generation Partnership Project; Technical Specification Group Core Network and Terminals; 5G System; Authentication Server Services; Stage 3 (Release 16)," 3GPP TS 29.509, V16.5.0 pp. 1-60 (Sep. 2020).
"3rd Generation Partnership Project; Technical Specification Group Core Network and Terminals; Numbering, addressing and identification; (Release 16)," 3GPP TS 23.003, V16.4.0, pp. 1-141 (Sep. 2020).
"3rd Generation Partnership Project; Technical Specification Group Core Network and Terminals; 5G System; Session Management Services; Stage 3 (Release 16)," 3GPP TS 29.502, V16.5.0, pp. 1-260 (Sep. 2020).
"3rd Generation Partnership Project; Technical Specification Group Services and System Aspects; System architecture for the 5G System (5GS); Stage 2 (Release 16)," 3GPP TS 23.501, V16.6.0, pp. 1-447 (Sep. 2020).
3rd Generation Partnership Project; Technical Specification Group Services and System Aspects; Procedures for the 5G System (5GS); Stage 2 (Release 16), 3GPP TS 23.502, V16.6.0, pp. 1-597 (Sep. 2020).
Notice of Allowance and Fee(s) Due and Examiner-Initiated Interview Summary for U.S. Appl. No. 16/100,172 (dated Sep. 14, 2020).
Commonly-Assigned, co-pending U.S. Appl. No. 17/008,528 for "Methods, Systems, and Computer Readable Media for 5G User Equipment (UE) Historical Mobility Tracking and Security Screening Using Mobility Patterns," (Unpublished, filed Aug. 31, 2020).
First Office Action for Chinese Application Serial No. 201880040477.9 (dated Aug. 5, 2020).
"3rd Generation Partnership Project; Technical Specification Group Services and System Aspects; System architecture for the 5G System (5GS); Stage 2 (Release 16)," 3GPP TS 23.501 V16.5.1, pp. 1-440 (Aug. 2020).
"3rd Generation Partnership Project; Technical Specification Group Core Network and Terminals; 5G System; Network Function Repository Services; Stage 3 (Release 16)," 3GPP TS 29.510, V16.4.0, pp. 1-206 (Jul. 2020).
Notification of Transmittal of the International Search Report and the Written Opinion of the International Searching Authority, or the Declaration for International Application No. PCT/US2020/024234 (dated Jul. 16, 2020).
Non-Final Office Action for U.S. Appl. No. 16/379,488 (dated Jul. 15, 2020).
Commonly-Assigned, co-pending U.S. Appl. No. 16/929,048 for "Methods, Systems, and Computer Readable Media for Mitigating 5G Roaming Security Attacks Using Security Edge Protection Proxy (SEPP)," (Unpublished, filed Jul. 14, 2020).
"3rd Generation Partnership Project; Technical Specification Group Services and System Aspects; Architecture enhancements for 5G System (5GS) to support network data analytics services (Release 16)," 3GPP TS 23.288 V16.4.0, pp. 1-66 (Jul. 2020).
"3rd Generation Partnership Project; Technical Specification Group Core Network and Terminals; 5G System; Public Land Mobile Network (PLMN) Interconnection; Stage 3 (Release 16)," 3GPP TS 29.573, V16.3.0, pp. 1-86 (Jul. 2020).
"3rd Generation Partnership Project; Technical Specification Group Services and System Aspects; Security architecture and procedures for 5G system (Release 16)," 3GPP TS 33.501, V16.3.0, pp. 1-248 (Jul. 2020).
Non-Final Office Action for U.S. Appl. No. 16/024,422 (dated Jul. 8, 2020).
"3rd Generation Partnership Project; Technical Specification Group Core Network and Terminals; 5G System; Network Function Repository Services; Stage 3 (Release 16)," 3GPP TS 29.510, V16.4.0, pp. 1-192 (Jul. 2020).
Applicant-Initiated Interview Summary for U.S. Appl. No. 16/100,172 (dated Jun. 9, 2020).
"3rd Generation Partnership Project; Technical Specification Group Core Network and Terminals; 5G System; Technical Realization of Service Based Architecture; Stage 3 (Release 16)," 3GPP TS 29.500 V16.4.0, pp. 1-79 (Jun. 2020).
"3rd Generation Partnership Project; Technical Specification Group Core Network and Terminals; 5G System; Network Data Analytics Services; Stage 3 (Release 16)," 3GPP TS 29.520 V16.4.0, pp. 1-91 (Jun. 2020).

(56) References Cited

OTHER PUBLICATIONS

Communication of European publication number and information on the application of Article 67(3) EPC for European Application Serial No. 18731923.1 (dated Apr. 8, 2020).

"3rd Generation Partnership Project; Technical Specification Group Services and System Aspects; Security architecture and procedures for 5G system (Release 16)," 3GPP TS 33.501, V16.2.0, pp. 1-227 (Mar. 2020).

"3rd Generation Partnership Project; Technical Specification Group Services and System Aspects; Procedures for the 5G System (5GS); Stage 2 (Release 16)," 3GPP TS 23.502, V16.4.0, pp. 1-582 (Mar. 2020).

Non-Final Office Action for U.S. Appl. No. 16/100,172 (dated Mar. 6, 2020).

Notice of Allowance and Fee(s) Due and Examiner-Initiated Interview Summary for U.S. Appl. No. 15/666,300 (dated Feb. 13, 2020).

Commonly-Assigned, co-pending U.S. Appl. No. 16/732,098 for "Methods, Systems, and Computer Readable Media for Implementing Indirect General Packet Radio Service (GPRS) Tunneling Protocol (GTP) Firewall Filtering Using Diameter Agent and Signal Transfer Point (STP)," (Unpublished, filed Dec. 31, 2019).

Advisory Action and Applicant-Initiated Interview Summary for U.S. Appl. No. 16/100,172 (dated Dec. 20, 2019).

"3rd Generation Partnership Project; Technical Specification Group Services and System Aspects; 5G Security Assurance Specification (SCAS) for the Security Edge Protection Proxy (SEPP) network product class (Release 16)," 3GPP TS 33.517, V.16.1.0, pp. 1-17 (Dec. 2019).

"FS.19 Diameter Interconnect Security," GSMA, pp. 1-3 (Dec. 20, 2019).

Notification of Transmittal of the International Search Report and the Written Opinion of the International Searching Authority, or the Declaration for International Application Serial No. PCT/US2019/042203 (dated Nov. 11, 2019).

Applicant-Initiated Interview Summary for U.S. Appl. No. 15/666,300 (dated Oct. 29, 2019).

Final Office Action for U.S. Appl. No. 16/100,172 (dated Oct. 3, 2019).

"Technical Specification Group Core Network and Terminals; Evolved Packet System (EPS); Mobility Management Entity (MME) and Serving GPRS Support Node (SGSN) related interfaces based on Diameter protocol (Release 16)," 3GPP TS 29.272, V16.0.0, pp. 1-180 (Sep. 2019).

"Technical Specification Group Core Network and Terminals; Policy and Charging Control (PCC); Reference points (Release 16)," 3GPP TS 29.212, V16.1.0, pp. 1-285 (Sep. 2019).

Notification of Transmittal of the International Search Report and the Written Opinion of the International Searching Authority, or the Declaration for International Application Serial No. PCT/US2019/028814 (dated Aug. 20, 2019).

Applicant-Initiated Interview Summary for U.S. Appl. No. 16/100,172 (dated Jul. 18, 2019).

Notice of Allowance and Fee(s) Due and Examiner-Initiated Interview Summary for U.S. Appl. No. 15/376,631 (dated Jul. 2, 2019).

"Technical Specification Group Core Network and Terminals; Mobile Application Part (MAP) specification (Release 15)," 3GPP TS 29.002, V15.5.0, pp. 1-1024 (Jun. 2019).

Non-Final Office Action for U.S. Appl. No. 15/666,300 (dated Jun. 27, 2019).

Decision on Appeal for U.S. Appl. No. 13/047,287 (dated Jun. 18, 2019).

Notification of Transmittal of the International Search Report and the Written Opinion of the International Searching Authority, or the Declaration for International Patent Application No. PCT/US2019/018990 (dated May 8, 2019).

Commonly-Assigned, co-pending U.S. Appl. No. 16/379,488 for "Methods, Systems, and Computer Readable Media for Dynamically Learning and Using Foreign Telecommunications Network Mobility Management Node Information for Security Screening," (Unpublished, filed Apr. 9, 2019).

Non-Final Office Action for U.S. Appl. No. 16/100,172 (dated Apr. 11, 2019).

Notice of Allowance and Fee(s) Due for U.S. Appl. No. 16/035,008 (dated Jan. 18, 2019).

Advisory Action Before the Filing of an Appeal Brief and AFCP 2.0 Decision for U.S. Appl. No. 15/376,631 (dated Dec. 19, 2018).

Notice of Allowance and Fee(s) Due and Applicant-Initiated Interview Summary for U.S. Appl. No. 15/408,155 (dated Oct. 31, 2018).

Sahu et al., "How 5G Registration Works," http://5gblogs.com/5g-registration/, 10 pages (Oct. 12, 2018).

Notification of Transmittal of the International Search Report and the Written Opinion of the International Searching Authority, or the Declaration for International Patent Application No. PCT/US2018/043985 (dated Oct. 9, 2018).

Final Office Action for U.S. Appl. No. 15/376,631 (dated Oct. 5, 2018).

Notice of Allowance and Fee(s) Due for U.S. Appl. No. 15/636,118 (dated Oct. 3, 2018).

Notification of Transmittal of the International Search Report and the Written Opinion of the International Searching Authority, or the Declaration for International Application No. PCT/US2018/030319 (dated Aug. 20, 2018).

Final Office Action for U.S. Appl. No. 15/408,155 (dated Jul. 26, 2018).

Notice of Allowance and Fee(s) Due for U.S. Appl. No. 15/636,118 (dated Apr. 27, 2018).

Non-Final Office Action for U.S. Appl. No. 15/376,631 (dated Apr. 18, 2018).

"Signalling Security in Telecom SS7/Diameter/5G," Enisa, pp. 1-30 (Mar. 2018).

Examiner's Answer for U.S. Appl. No. 13/047,287 (dated Feb. 26, 2018).

Advisory Action Before the Filing of an Appeal Brief and AFCP 2.0 Decision for U.S. Appl. No. 15/376,631 (dated Feb. 2, 2018).

Non-Final Office Action for U.S. Appl. No. 15/408,155 (dated Jan. 9, 2018).

Final Office Action for U.S. Appl. No. 15/376,631 (dated Nov. 28, 2017).

"GSMA Guidelines for Diameter Firewall," NetNumber Inc., pp. 1-7 (Sep. 12, 2017).

"Oracle Communications Diameter Signaling Router Main Differentiators," Oracle White Paper, pp. 1-10 (Jul. 2017).

"LTE and EPC Roaming Guidelines," GSM Association, Official Document IR.88, V 16.0, pp. 1-90 (Jul. 5, 2017).

Non-Final Office Action for U.S. Appl. No. 15/376,631 (dated Jun. 16, 2017).

"LTE International Roaming Whitepaper," http://carrier.huawei.com/en/technical-topics/core-network/lte-roaming-whitepaper, pp. 1-16 (Downloaded May 12, 2017).

"Digital cellular telecommunications system (Phase 2+) (GSM); Universal Mobile Telecommunications System (UMTS); Universal Geographical Area Description (Gad) (3GPP TS 23.032 V 14.0.0 Release 14)," ETSI TS 123 032 V14.0.0, pp. 1-30 (May 2017).

Final Office Action for U.S. Appl. No. 13/047,287 (dated Mar. 10, 2017).

"3rd Generation Partnership Project; Technical Specification Group Services and System Aspects; Functional stage 2 description of Location Services (LCS) (Release 14)," 3GPP TS 23.271 V14.1.0, pp. 1-181 (Mar. 2017).

"Digital cellular telecommunications system (Phase 2+) (GSM); Universal Mobile Telecommunications System (UMTS); LTE; Cx and Dx interfaces based on the Diameter protocol; Protocol details (3GPP TS 29.229 V 13.1.0 Release 13)," ETSI TS 129 229 V13.1.0, pp. 1-42 (Jan. 2017).

"Edge Router (DEA)," http://www.mavenir.com/our-products/mobile/edge-router-dea, pp. 1-7 (Copyright 2017).

Non-Final Office Action for U.S. Appl. No. 13/047,287 (dated Aug. 25, 2016).

"Digital cellular telecommunications system (Phase 2+); Universal Mobile Telecommunications System (UMTS); Numbering, address-

(56) References Cited

OTHER PUBLICATIONS ing and identification (3GPP TS 23.003 V 12.9.0 Release 12)," ETSI TS 1 23 003 V12.9.0, pp. 1-93 (Mar. 2016).
"Syniverse Guide to LTE Roaming and Interoperability," https://www.syniverse.com/assets/files/custom_content/lte-roaming-interoperability-guide.pdf, pp. 1-11 (Jan. 8, 2016).
"Digital cellular telecommunications system (Phase 2+) (GSM); Universal Mobile Telecommunications System (UMTS); LTE; Location Services (LCS); LCS Application Protocol (LCS-AP) between the Mobile Management Entity (MME) and Evolved Serving Mobile Location Centre (E-SMLC); SLs interface (3GPP TS 29.171 V 11.4.0 Release 11)," ETSI TS 129 171 V11.4.0, pp. 1-52 (Jan. 2016).
"Diameter Signaling Control (DSC)," https://www.extent.com/diameter-signaling-control-dsc/, pp. 1-3 (Copyright 2016).
Kotte, "Analysis and Experimental Verification of Diameter Attacks in Long Term Evolution Networks," http://www.diva-portal.org/smash/get/diva2:951619/FULLTEXT01.pdf, pp. 1-72 (2016).
Advisory Action Before the Filing of an Appeal Brief for U.S. Appl. No. 13/047,287 (dated Oct. 16, 2015).
"The Dialogic® Helix™ Signaling Controller," https://www.dialogic.com/-/media/products/docs/brochures/14090-helix-br.pdf, pp. 1-5 (Aug. 2015).
Final Office Action for U.S. Appl. No. 13/047,287 (dated Jun. 4, 2015).
"Digitial cellular telecommunications system (Phase 2+); Universal Mobile Telecommunications System (UMTS); LTE; Location Services (LCS); Evolved Packet Core (EPC) LCS Protocol (ELP) between the Gateway Mobile Location Centre (GMLC) and the Mobile Management Entity (MME); SLg interface (3GPP TS 29.172 version 9.6.0 Release 9)," ETSI TS 129 172, V9.6.0, pp. 1-27 (Apr. 2015).
"Digital cellular telecommunications system (Phase 2+); Universal Mobile Telecommunications System (UMTS); LTE; Location Services (LCS); Diameter-based SLh interface for Control Plane LCS (3GPP TS 29.173 version 12.2.0 Release 12)," ETSI TS 129 173, V12.2.0., p. 1-20 (Oct. 2014).
Non-Final Office Action for U.S. Appl. No. 13/047,287 (dated Sep. 25, 2014).
Supplemental Notice of Allowance and Fee(s) Due for U.S. Appl. No. 12/823,559 (dated Aug. 23, 2013).
Notice of Allowance and Fee(s) Due for U.S. Appl. No. 12/823,559 (dated Aug. 1, 2013).
Email to U.S. Patent and Trademark Office dated Jun. 28, 2013.
Final Office Action for U.S. Appl. No. 12/823,559 (dated Apr. 11, 2013).
Final Office Action for U.S. Appl. No. 13/047,287 (dated Jan. 31, 2013).
Non-Final Office Action for U.S. Appl. No. 12/823,559 (dated Nov. 14, 2012).
"Digital cellular telecommunications system (Phase 2+); Universal Monile Telecommunications System (UMTS); LTE; Location Services (LCS); Service description; Stagel (3GPP TS 22.071 V 11.0.0 Release 11," ETSI TS 122 071 V11.0.0, pp. 1-50 (Oct. 2012).
Restriction and/or Election Requirement for U.S. Appl. No. 12/823,559 (dated Aug. 27, 2012).
Notice of Allowance and Fee(s) due for U.S. Appl. No. 12/581,739 (dated Aug. 8, 2012).
Non-Final Office Action for U.S. Appl. No. 13/047,287 (dated Jun. 6, 2012).
Notice of Allowance and Fee(s) Due and Examiner-Initiated Interview Summary for U.S. Appl. No. 12/581,739 (dated May 15, 2012).
Non-Final Office Action for U.S. Appl. No. 12/722,460 (dated Apr. 9, 2012).
"3rd Generation Partnership Project; Technical Specification Group Services and System Aspects; Telecommunication management; Charging management; Diameter charging applications (Release 11)," 3GPP TS 32.299, V11.3.0, pp. 1-150 (Mar. 2012).

"Net-Net Diameter Director," http://www.oracle.com/us/industries/communications/net-net-diameter-director-ds-1985034.pdf, pp. 1-9 (Copyright 2012).
Final Office Action for U.S. Appl. No. 12/581,739 (dated Dec. 30, 2011).
"3rd Generation Partnership Project; Technical Specification Group Core Network and Terminals; Policy and Charging Control (PCC) over Gx/Sd reference point (Release 11)," 3GPP TS 29.212, V11.3.0, pp. 1-171 (Dec. 2011).
Non-Final Office Action for U.S. Appl. No. 12/581,739 (dated Aug. 26, 2011).
Press Release, "SmartSynch SmartMeters Communicate Using the Largest and Most Available Wireless Networks in the World," http://www.smartsynch.com/SmartSynch_gprs.htm, pp. 1-2 (Downloaded from the Internet on Jul. 5, 2011).
"Solution: Itron CENTRON GPRS," Data Sheet, http://www.smartsynch.com/SmartSynch_itron_centron.htm, pp. 1-3 (Downloaded from the Internet on Jul. 5, 2011).
Myers, "SmartSynch Introduces Innovative 'DCX' Smart Grid Solution at DistribuTECH," SmartSynch News, http://www.appmesh.com/news/020309.htm, pp. 1-3 Feb. 3, 2009 (Downloaded from the Internet on Jul. 5, 2011).
"NES System Architecture," Data Sheet, Copyright 2009, pp. 1-2 (Downloaded from the Internet on Jul. 5, 2011).
"Wireless M-Bus and ZigBee®-enabled GSM/GPRS/ EDG Gateway for Smart Metering Introduced," Metering.com, http://www.metering.com/node/13550 Sep. 19, 2008, pp. 1-2 (Downloaded from the Internet on Jul. 5, 2011).
Notification of Transmittal of the Internatioanl Search Report and the Written Opinion of the International Searching Authority, or the Declaration for International Application No. PCT/US2010/027043 (dated Oct. 19, 2010).
"Draft LS on network verification of UE provided location," 3GPP TSG SA WG2 Meeting #81, p. 1 (Oct. 11-15, 2010).
Notification of Transmittal of the International Search Report and the Written Opinion of the International Searching Authority, or the Declaration for International Application No. PCT/US2009/061187 (dated May 17, 2010).
Press Release, "Echelon and T-Mobile Announce Alliance to Reduce the Cost of a Secure Smart Grid Network for Utilities," Echelon Corp., http://www.3gamericas.org/index.cfm?fuseaction=pressreleasedisplay&pressreleaseid=2201, pp. 1-3 (Apr. 23, 2009).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 8)," 3GPP TS 29.272, V8.1.1, pp. 1-57 (Jan. 2009).
"3rd Generation Partnership Project; Technical Specification Group Core Network; Unstructured Supplementary Service Data (USSD); Stage 2 (Release 8)," 3GPP TS 23.090, V8.0.0, pp. 1-32 (Dec. 2008).
"3rd Generation Partnership Project; Technical Specification Group Services and System Aspects; Unstructured Supplementary Service Data (USSD)—Stage 1 (Release 8)," 3GPP TS 22.090, V8.0.0, pp. 1-10 (Dec. 2008).
"Digital cellular telecommunications system (Phase 2+); Universal Mobile Telecommunications System (UMTS); Circuit Switched (CS) fallback in Evolved Packet System (EPS); Stage 2 (3GPP TS 23.272 V 8.0.0 Release 8)," ETSI TS 123 272 V8.0.0, pp. 1-42 (Nov. 2008).
3rd Generation Partnership Project "Technical Specification Group Core Network and Terminals; Study into routeing of MT-SMs via the HPLMN (Release 7)," 3GPP TR 23.840 V7.1.0 (Mar. 2007).
Hakala et al., "Diameter Credit-Control Application," RFC 4006, pp. 1-115 (Aug. 2005).
Notification of Transmittal of the International Search Report and the Written Opinion of the International Searching Authority, or the Declaration for International Application No. PCT/US2022/013373 (dated Apr. 11, 2022).
Non-Final Office Action and Examiner Interview Summary for U.S. Appl. No. 16/929,048 (dated Apr. 14, 2022).
Notice of Allowance for U.S. Appl. No. 16/732,098 (dated Apr. 6, 2022).

(56) References Cited

OTHER PUBLICATIONS

Examination Report for Indian Application Serial No. 202147030053 (dated Mar. 22, 2022).
Notification of Transmittal of the International Search Report and the Written Opinion of the International Searching Authority or the Declaration for International Application No. PCT/US2021/057156 (dated Mar. 3, 2022).
Non-Final Office Action for Chinese Application Serial No. 202080007649.X (dated Mar. 2, 2022).
Non-Final Office Action for U.S. Appl. No. 17/076,482 (dated Apr. 1, 2022).
Nokia et al., "Support of the mapping from IP addressing information provided to an AF to the user identity," 3GPP SA WG2 Meeting #142e pp. 1-3 (Nov. 16-20, 2020).
China Telecom, "KI #13, New Sol: Trigger Procedures for Requesting Analytics," 3GPP SA WG2 Meeting #S2-139E pp. 1-4 (Aug. 19-Sep. 2, 2020).
First Office Action for Japanese Application Serial No. 2021545918 (dated Mar. 8, 2022).
Decision to grant a European patent pursuant to Article 97(1) EPC for European Patent Application Serial No. 19710842.6 (dated Feb. 24, 2022).
Notice of Allowance for Chinese Application Serial No. 201880040478.3 (dated Feb. 28, 2022).
Notice of Allowance for Japanese Application Serial No. 2019572174 (dated Feb. 8, 2022).
Final Office Action for U.S. Appl. No. 17/099,683 (dated Feb. 15, 2022).
Notification of Transmittal of the International Search Report and the Written Opinion of the International Searching Authority, or the Declaration for International Application No. PCT/US2021/057157 (dated Jan. 27, 2022).
"KI#13, New Sol: Trigger Procedures for Request Analytics," China Telecom, SA WG2 Meeting #S2-139E, pp. 1-4 (Aug. 19-Sep. 2, 2020).
Notice of Allowance and Fee(s) Due and Examiner-Initiated Interview Summary for U.S. Appl. No. 17/185,934 (dated Jul. 21, 2022).
Non-Final Office Action for U.S. Appl. No. 17/099,683 (dated Jul. 15, 2022).
Decision to grant a European patent pursuant to Article 97(1) EPC for European Patent Application Serial No. 19710842.6 (dated Jun. 30, 2022).
Notice of Allowance for Chinese Application Serial No. 202080007649.X (dated Jun. 20, 2022).
Communication under Rule 71 (3) EPC Intention to Grant for European Patent Application Serial No. 19 749 059.2 (dated May 16, 2022).
Notification of Transmittal of the International Search Report and the Written Opinion of the International Searching Authority or the Declaration for International Application No. PCT/US2021/042853 (dated Oct. 18, 2021).
Advisory Action and Applicant-Initiated Interview Summary for U.S. Appl. No. 17/099,683 (dated May 23, 2022).
"5G; Procedures for the 5G System (3GPP TS 23.502 version 15.3.0 Release 15)," ETSI TS 123 502, V15.3.0, pp. 1-330 (Sep. 2018).
"Edge Router (DEA)," Mavenir, pp. 1-7 (2017).
Press Release, "Echelon and T-Mobile Announce Alliance to Reduce the Cost of a Secure Smart Grid Network for Utilities," Echelon Corp., https://www.tdworld.com/smart-utility/article/20956244/echelon-and-tmobile-announce-alliance-to-reduce-the-cost-of-a-secure-smart-grid-network-for-utilities, p. 1-10 (May 14, 2009).

\* cited by examiner

500

| NETWORK AND/OR NODE ID | CURRENT MSG RATE (IN TPS) | ALLOWED MSG RATE (IN TPS) | MSG THROTTLE RATE (IN TPS) |
|---|---|---|---|
| MNO-1 | 50 | 40 | 10 |
| MNO-2 | 14 | 40 | |
| MNO-3 | 26 | 40 | |

METHODS, SYSTEMS, AND COMPUTER READABLE MEDIA FOR INGRESS MESSAGE RATE LIMITING

PRIORITY CLAIM

This application claims the priority benefit of Indian Provisional Patent Application Serial No. 202041048552, filed Nov. 6, 2020, the disclosure of which is incorporated herein by reference in its entirety.

TECHNICAL FIELD

The subject matter described herein relates to enhancing security in 5G communication networks. More particularly, the subject matter described herein relates to methods, systems, and computer readable media for ingress message rate limiting.

BACKGROUND

In 5G telecommunications networks, the network node that provides service is referred to as a producer network function (NF). A network node that consumes services is referred to as a consumer NF. A network function can be both a producer NF and a consumer NF depending on whether it is consuming or providing service.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. Consumer NFs can subscribe to receive information about producer NF instances that have registered with the NRF. In addition to consumer NFs, another type of network node that can subscribe to receive information about NF service instances is a service communication proxy (SCP). The SCP subscribes with the NRF and obtains reachability and service profile information regarding producer NF service instances. Consumer NFs connect to the service communication proxy, and the service communication proxy load balances traffic among producer NF service instances that provide the required service or directly routes the traffic to the destination producer NF instance.

In addition to the SCP, other examples of intermediate proxy nodes or groups of network nodes that route traffic between producer and consumer NFs include the security edge protection proxy (SEPP), the service gateway, and nodes in the 5G service mesh. The SEPP is the network node used to protect control plane traffic that is exchanged between different 5G public land mobile networks (PLMNs). As such, the SEPP performs message filtering, policing, and topology hiding for all application programming interface (API) messages.

However, there exists a need for improved security measures at one or more NFs.

SUMMARY

Methods, systems, and computer readable media for ingress message rate limiting are disclosed. One example method for ingress message rate limiting occurs at a first network node of a first network comprises: obtaining, from a transport layer security (TLS) message from a second network node of a second network, an identifier identifying the second network node or the second network; receiving a request message from the second network node or the second network; determining, using the identifier, that an allowed ingress message rate associated with the second network node or the second network has been reached or exceeded; and in response to determining that the allowed ingress message rate associated with the second network node or the second network has been reached or exceeded, performing a rate limiting action.

One example system for ingress message rate limiting includes a first network node of a first network comprising at least one processor and a memory. The first node is configured for: obtaining, from a transport layer security (TLS) message from a second network node of a second network, an identifier identifying the second network node or the second network; receiving a request message from the second network node or the second network; determining, using the identifier, that an allowed ingress message rate associated with the second network node or the second network has been reached or exceeded; and in response to determining that the allowed ingress message rate associated with the second network node or the second network has been reached or exceeded, performing a rate limiting action.

One example non-transitory computer readable medium comprising computer executable instructions embodied in the non-transitory computer readable medium that when executed by at least one processor of at least one computer cause the at least one computer to perform steps comprising: at a first network node of a first network: obtaining, from a transport layer security (TLS) message from a second network node of a second network, an identifier identifying the second network node or the second network; receiving a request message from the second network node or the second network; determining, using the identifier, that an allowed ingress message rate associated with the second network node or the second network has been reached or exceeded; and in response to determining that the allowed ingress message rate associated with the second network node or the second network has been reached or exceeded, performing a rate limiting action.

According to an aspect of the subject matter described herein, obtaining an identifier from a TLS message may include obtaining the identifier from a certificate (e.g., an X.509v3 certificate) contained in the TLS message. For example, an X.509v3 certificate in a TLS message may include a subject field or a subject alternative name field that includes a FQDN associated with an identity of the sender. In this example, the FQDN may include or represent a network node identifier or a network identifier, e.g., the network identifier may be stored in a format like "5gc.mnc<MNC>.mcc<MCC>.3gppnetwork.org", where "<MNC>" and "<MCC>" fields correspond to the MNC and MCC of an operator's PLMN.

According to an aspect of the subject matter described herein, determining that an allowed ingress message rate associated with a second network node or a second network has been reached or exceeded may comprise obtaining the allowed ingress message rate associated with the second network node or the second network; obtaining a current ingress message rate associated with the second network node or the second network; and comparing the current ingress message rate and the allowed ingress message rate for determining that the current ingress message rate meets or exceeds the allowed ingress message rate.

According to an aspect of the subject matter described herein, obtaining a current ingress message rate associated with a second network node or a second network may include tracking or deriving messages rates for a plurality of SEPPs in the second network to determine the current ingress rate associated with the second network. For example, assuming rate limiting is based on an originating network identifier, SEPP 126 may track ingress message rates across a plurality of N32-f interface connections and may combine ingress messages rates for a plurality of SEPPs associated with a same network identifier and may compare the combined ingress message rate associated with the network identifier to a predetermined allowed ingress message rate associated with the network identifier.

According to an aspect of the subject matter described herein, a rate limiting action may include discarding a request message, generating or modifying a throttle rate for discarding a portion of messages, or notifying a network operator or a management system.

The subject matter described herein may be implemented in hardware, software, firmware, or any combination thereof. As such, the terms "function" "node" or "module" as used herein refer to hardware, which may also include software and/or firmware components, for implementing the feature being described. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which:

FIG. 5 is a diagram illustrating example message rate related data;

DETAILED DESCRIPTION

Reference will now be made in detail to various embodiments of the subject matter described herein, examples of which are illustrated in the accompanying drawings. Wherever possible, the same reference numbers will be used throughout the drawings to refer to the same or like parts.

Figure 1:
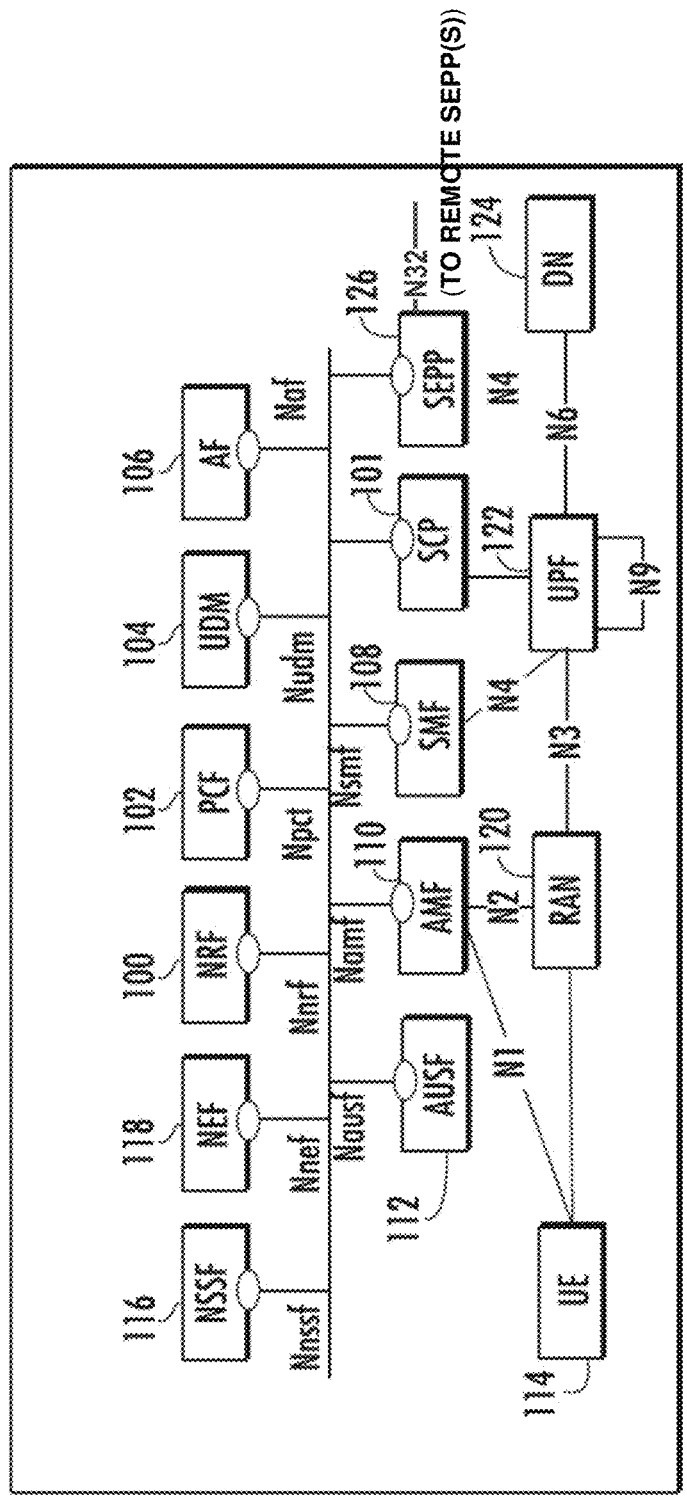
FIG. 1 is a network diagram illustrating an example 5G network architecture.

FIG. 1 is a block diagram illustrating an example 5G system network architecture, e.g., a home 5G core (5GC) network. The architecture in FIG. 1 includes NRF 100 and SCP 101, which may be located in the same home public land mobile network (PLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs. In addition, using the methodologies described herein, SCP 101 may perform preferred NF location based selection and routing.

NRF 100 is a repository for NF or service profiles of producer NF instances. In order to communicate with a producer NF instance, a consumer NF or an SCP must obtain the NF or service profile or the producer NF instance from NRF 100. The NF or service profile is a JavaScript object notation (JSON) data structure defined in Third Generation Partnership Project (3GPP) Technical Specification (TS) 29.510. The NF or service profile definition includes at least one of a fully qualified domain name (FQDN), an Internet protocol (IP) version 4 (IPv4) address or an IP version 6 (IPv6) address. In FIG. 1, any of the nodes (other than NRF 100) can be either consumer NFs or producer NFs, depending on whether they are requesting or providing services. In the illustrated example, the nodes include a policy control function (PCF) 102 that performs policy related operations in a network, a unified data management (UDM) function 104 that manages user data, and an application function (AF) 106 that provides application services. The nodes illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

Security edge protection proxy (SEPP) 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse two SEPP functions, one for the home PLMN and the other for the foreign PLMN.

SEPP 126 may utilize an N32-c interface and an N32-f interface. An N32-c interface is a control plane interface between two SEPPs usable for performing an initial handshake (e.g., a TLS handshake) and negotiating various parameters for an N32-f interface connection and related message forwarding. An N32-f interface is a forwarding interface between two SEPPs usable for forwarding various communications (e.g., 5GC requests) between a consumer NF and a producer NF after applying application level security protection.

Generally, an N32-f interface connection between SEPPs utilizes a TLS protection mode, but may use a PRINS based protection mode if there are one or more IP exchanges between the SEPPS. While an N32-f context identifier is created as part of the handshake procedure when setting up an N32-f interface connection using a PRINS based protection mode, no N32-f context identifier is created when setting up an N32-f interface connection using a TLS protection mode. Further, forwarded messages sent via an N32-f interface connection using a TLS protection mode are HTTP/2 messages and may not include a source SEPP identity.

One potential issue with the existing 5G architecture is that a SEPP in a foreign PLMN can trigger a signaling storm by sending a significant number of inter-PLMN messages to another SEPP in a home PLMN. While the receiving SEPP or the home PLMN can initiate a global message rate limiting procedure to reduce or mitigate consequences of the signaling storm, global message rate limiting can discard messages from networks and SEPPS that are not responsible for or associated with the signaling storm.

Figure 2:
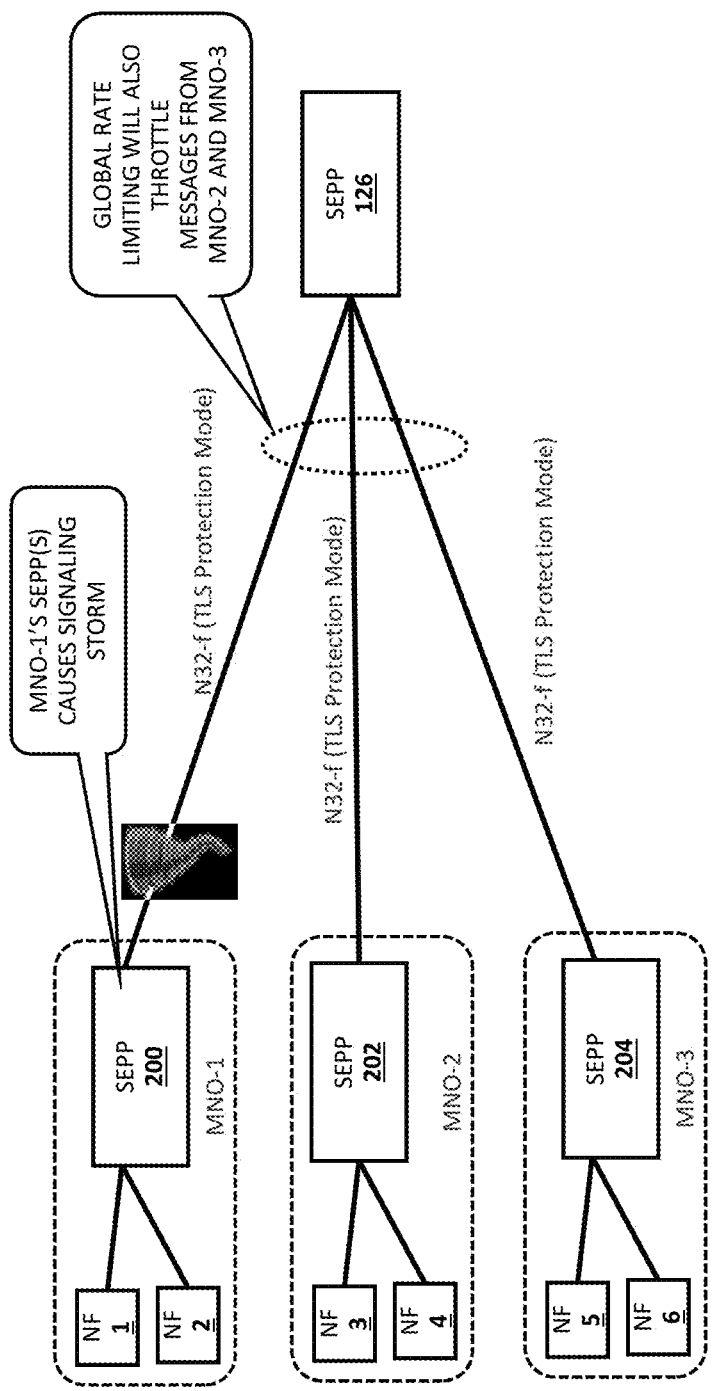
FIG. 2 is a diagram illustrating N32-f interface connections using transport layer security (TLS)

FIG. 2 is a diagram illustrating N32-f interface connections using TLS. In FIG. 2, SEPP 126 may be connected to various SEPPs in networks controlled by different mobile network operators (MNOs). As depicted in FIG. 2, SEPP 126 is connected to SEPP 200 in an 'MNO-1' network via an N32-f interface connection using a TLS protection mode. SEPP 126 is connected to SEPP 202 in an 'MNO-2' network via an N32-f interface connection using a TLS protection mode. SEPP 126 is connected to SEPP 204 in an 'MNO-3' network via an N32-f interface connection using a TLS protection mode.

In some embodiments, SEPP 126 may include functionality defined in 3GPP TS 33.501, e.g., message protection, mutual authentication, key management, topology hiding, access control, discard malformed N32 signaling messages, rate limiting, anti-spoofing mechanism. For example, when SEPP 200 and/or other SEPPs in the 'MNO-1' network are sending a significant amount of traffic (e.g., a signaling storm) such that network congestion and/or other issues are experienced by SEPP 126 or nodes in its home network, SEPP 126 may implement a global message rate limiting procedure which may throttle or discard ingress messages in an effort to reduce a global ingress message rate. However, such a procedure is generally indiscriminate with regard to which network's messages are throttled or discarded.

While global message rate limiting can mitigate negative effects of a signaling storm, such rate limiting may also unfairly discard or throttle traffic associated with networks (e.g., 'MNO-2' and 'MNO-3' networks) that are not responsible for or associated with the signaling storm.

Effective identifiers for performing selective ingress message rate limiting may not be readily available depending on a variety of factors. For example, while N32-f context IDs can be use for N32-f interface connections that use PRINS based protection, such IDs are not available for N32-f interface connections that use TLS protection. Further, while sender identifiers may potentially be parsed or derived from individual inter-PLMN messages, HTTP/2 messages that typically traverse N32-f interface connections that use TLS protection may not include a source SEPP identity and using source IP addresses can be cumbersome because of network address translation and multiple SEPP instances and/or connections. Moreover, a rate limiting solution requiring such parsing may be resource intensive, lack scalability, and/or be otherwise undesirable.

The subject matter described herein addresses such issues by providing methods or techniques for efficient and selective ingress message rate limiting per PLMN or node therein, e.g., by discarding excessive inter-PLMN messages only from a culprit network. Further, such methods and techniques can perform ingress message rate limiting of inter-PLMN messages with little to no additional overhead and can also avoid parsing inter-PLMN messages for a PLMN identifier. For example, an ingress message rate limiting method or technique described herein may obtain an origination or sender identifier (e.g., a FQDN or a network domain identifier) from a TLS message or an X.509 certificate received during a handshake procedure and then rate limit ingress messages based on that identifier.

Figure 3:
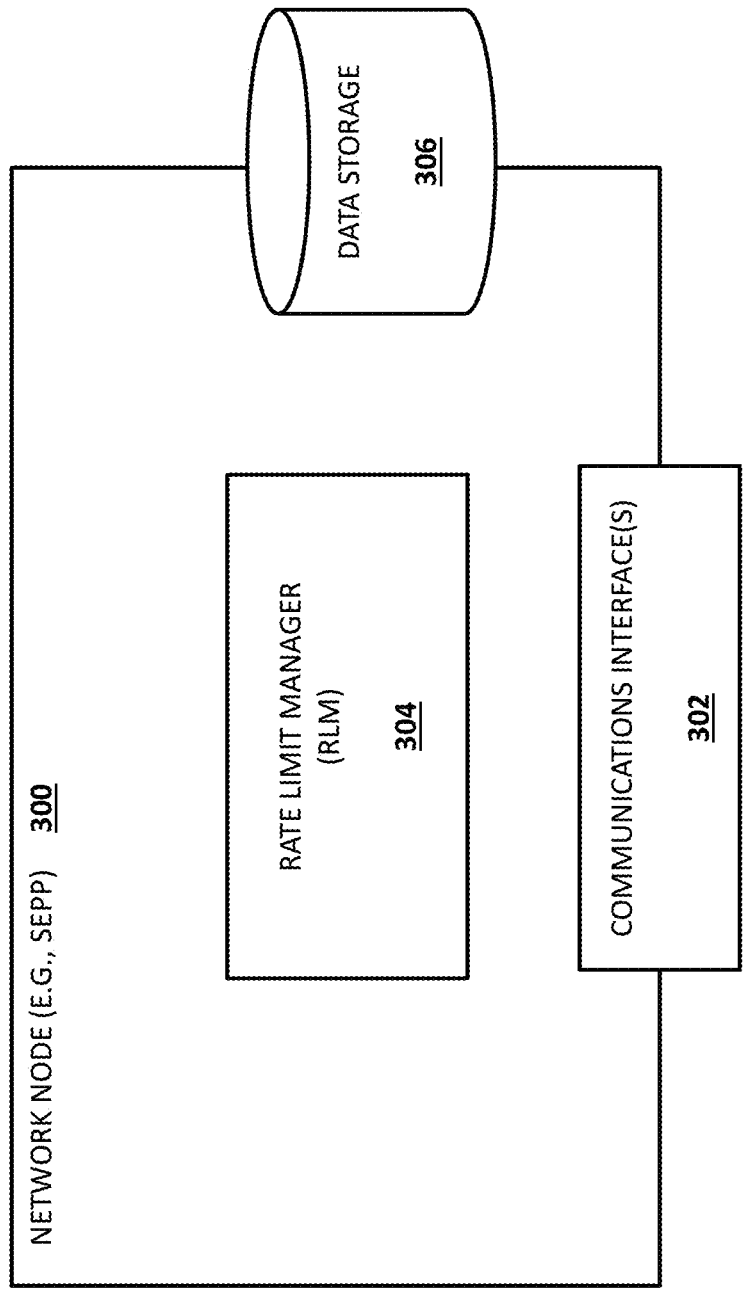
FIG. 3 is a diagram illustrating an example node for ingress message rate limiting.

FIG. 3 is a diagram illustrating an example node 300 for ingress message rate limiting. Node 300 may represent any suitable entity or entities for performing aspects of ingress message rate limiting. In some embodiments, node 300 may represent or include one or more 5GC NFs, e.g., a SEPP, an NRF, a PCF, an NSSF, an NEF, a UDM, an AUSF, a UDR, a binding support function (BSF), or an unstructured data storage function (UDSF). In some embodiments, node 300 may represent or include a network gateway, a network proxy, an edge security device, or related functionality.

In some embodiments, node 300 or a related module may be configured (e.g., via programming logic) to perform ingress message rate limiting on inter-PLMN messages based on their originating PLMN, thereby reducing or mitigating the impact of control plane signaling storms on the node or other downstream NFs in the home network. For example, node 300 or a related module may be configured to identify a PLMN ID from a digital certificate received during a TLS handshake and may then rate limit ingress messages associated with the PLMN ID.

Referring to FIG. 3, node 300 may include one or more communications interface(s) 302 for communicating messages via a communications environment, e.g., a home 5GC network. In some embodiments, communications interface(s) 302 may include a first communication interface for communicating with one or more SEPPs in a first network, a second communications interface for communicating with one or more SEPPs in a second network, and a third communications interface for communicating with one or more SEPPs in a home network, e.g., a home 5GC network.

Node 300 may include a rate limit manager (RLM) 304. RLM 304 may be any suitable entity (e.g., software executing on at least one processor) for performing one or more aspects of ingress message rate limiting. In some embodiments, RLM 304 may include functionality for obtaining, from a TLS message from a network node, an identifier identifying the network node or a related network and using the identifier to perform ingress message rate limiting. For example, obtaining an identifier from a TLS message may include obtaining the identifier from a certificate (e.g., an X.509v3 certificate) contained in the TLS message. In this example, an X.509v3 certificate in a TLS message may include a subject field or a subject alternative name field that includes a FQDN associated with an identity of the sender. In this example, the FQDN may include or represent a network node identifier or a network identifier, e.g., the network identifier may be a PLMN ID or a network domain stored in a format like "5gc.mnc<MNC>.mcc<MCC>.3gppnetwork.org", where "<MNC>" and "<MCC>" fields correspond to the MNC and MCC of an operator's PLMN.

In some embodiments, e.g., after determining an identifier associated with a particular N32-f interface connection, RLM 304 may be configured for monitoring the N32-f interface connection for inter-PLMN messages (e.g., HTTP/2 messages). In this example, for each received inter-PLMN message, RLM 304 may determine, using the identifier, whether an allowed ingress message rate associated with the identifier has been reached or exceeded and in response to determining that the allowed ingress message rate associated with the identifier has been reached or exceeded, RLM 304 may perform a rate limiting action. Example rate limiting actions may include discarding a request message, generating or modifying a throttle rate for discarding a portion of ingress messages, and/or notifying a network operator or a management system regarding an ingress message rate or related event.

In some embodiments, RLM 304 may be configured for determining whether to perform ingress message rate limiting by obtaining an allowed ingress message rate associated with a network node or a network containing the network node; obtaining a current ingress message rate associated with the network node or the network; and comparing the current ingress message rate and the allowed ingress message rate. If the current ingress message rate meets or exceeds the allowed ingress message rate, then a rate limiting action may be performed. If the current ingress message rate meets or exceeds the allowed ingress message rate, then RLM 304 may allow the message to be handled or processed, e.g., without ingress message rate limiting.

In some embodiments, RLM 304 may be configured for tracking or deriving messages rates for a plurality of nodes or related connections. For example, assuming rate limiting is based on an originating network identifier, RLM 304 may track ingress message rates across a plurality of N32-f interface connections and may combine ingress messages rates for a plurality of SEPPs associated with a same network identifier and may compare the combined ingress message rate associated with the network identifier to a predetermined allowed ingress message rate associated with the network identifier.

Node 300 may access (e.g., read from and/or write information to) data storage 306. Data storage 306 may be any suitable entity (e.g., a computer readable medium or memory) for storing various data. In some embodiments, data storage 306 may include logic for obtaining identifiers for TLS messages and/or digital certificates, logic for checking whether to perform ingress message rate limiting, logic for implementing or triggering a rate limiting action, logic for tracking current ingress message rates associated with various connections (e.g., N32-f interface connections) and/or originating entities (e.g., PLMN IDs or FQDNs), and predetermined allowed message rates for one or more foreign networks and/or nodes therein.

In some embodiments, data storage 306 may include message rate limiting data. For example, data storage 306 may include information for identifying a current message rate, an allowed message rate, and/or a message throttle rate for various PLMNs or network nodes therein. In this example, related message rates and throttle rates may be indexed or otherwise identified using an identifier obtained from a TLS message or an X.509 certificate therein.

It will be appreciated that FIG. 3 and its related description are for illustrative purposes and that node 300 may include additional and/or different modules, components, or functionality.

Figure 4:
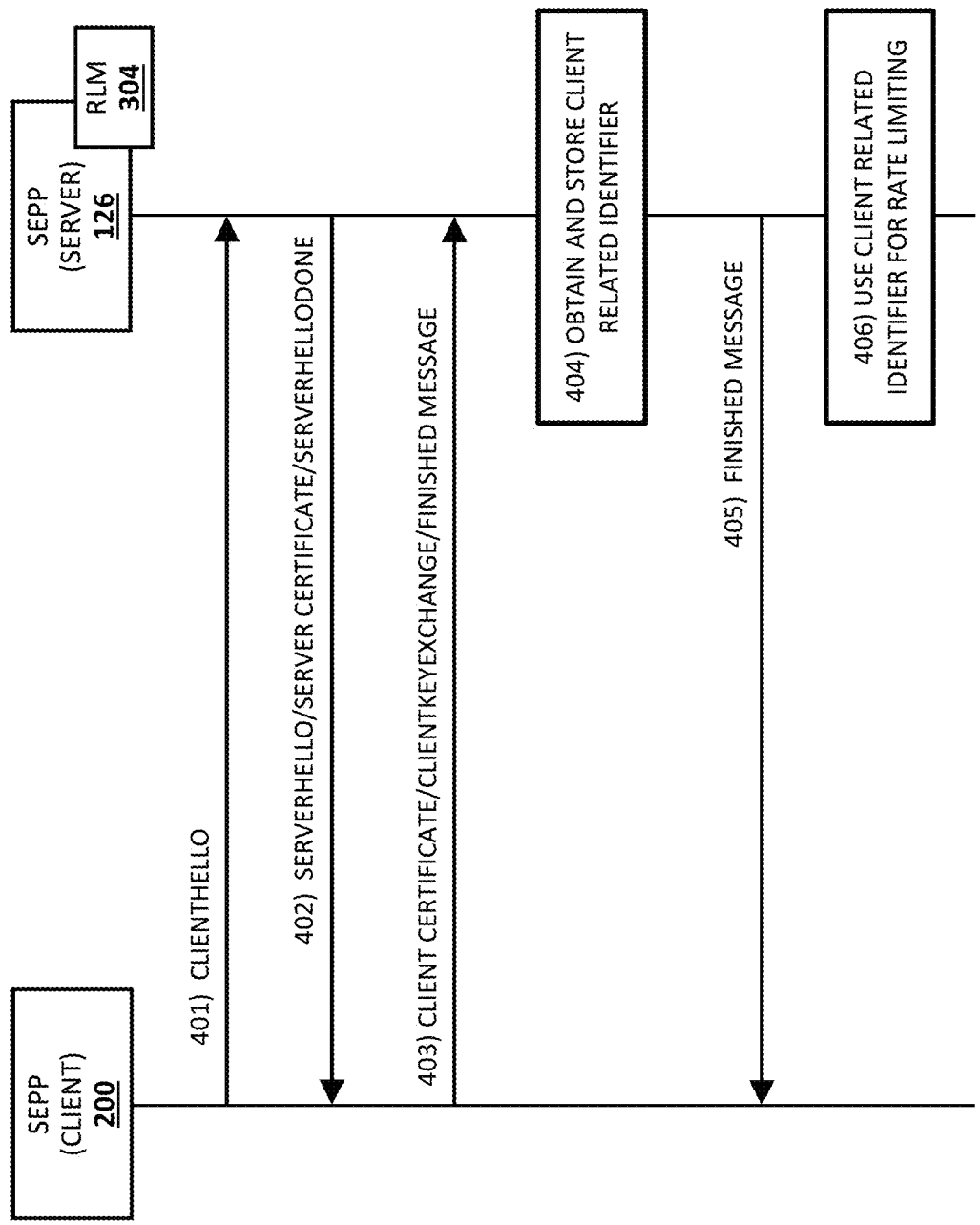
FIG. 4 is a message flow diagram illustrating a TLS handshake associated with an N32-f interface.

FIG. 4 is a message flow diagram illustrating a TLS handshake associated with setting up an N32-f interface connection between SEPP 200 and SEPP 126. In some embodiments, SEPP 126 or RLM 304 therein may be configured to obtain or determine an identifier associated with an initiating SEPP 200 when setting up or configuring an N32-f interface connection. For example, initiating SEPP 200 and responding SEPP 126 may exchange TLS handshake messages over an N32-c interface to establish a TLS connection. The TLS handshake may involve the exchange of ClientHello and ServerHello messages followed by the exchange of certificate messages. Each certificate message may contain the X.509 certificate of the sender. The identity of the sender may be contained in the X.509 certificate and is difficult to spoof because the X.509 certificate is signed by a certificate authority.

The TLS handshake protocol is defined in Internet Engineering Task Force (IETF) Request for Comments (RFC) 5246 and includes the exchange of certificate messages by both ends of the TLS connection. The structure of a TLS handshake message defined in IETF RFC 5246, including the certificate message, appears below:

```
enum {
    hello_request(0), client_hello(1), server_hello(2),
    certificate(11), server_key_exchange (12),
    certificate_request(13), server_hello_done(14),
    certificate_verify(15), client_key_exchange(16),
    finished(20), (255)
} HandshakeType;
struct {
    HandshakeType msg_type;    /* handshake type */
    uint24 length;             /* bytes in message */
    select (HandshakeType) {
        case hello_request:        HelloRequest;
        case client_hello:         ClientHello;
        case server_hello:         ServerHello;
        case certificate:          Certificate;
        case server_key_exchange:  ServerKeyExchange;
        case certificate_request:  CertificateRequest;
        case server_hello_done:    ServerHelloDone;
        case certificate_verify:   CertificateVerify;
        case client_key_exchange:  ClientKeyExchange;
        case finished:             Finished;
    } body;
} Handshake;
```

As illustrated by the TLS handshake message structure described above, one of the defined handshake message types is the certificate message, which contains the certificate of the client or server, depending on whether the sender is functioning as a client or a server. In establishing secure TLS communications over the N32-c interface, mutual TLS or m-TLS is used where both ends of the TLS connection receive and validate the other end's X.509 certificate. IETF RFC 5246 indicates that the type of certificate must be X.509v3 unless expressly negotiated otherwise. The examples described herein used the X.509v3 certificate as an example, but the subject matter described herein is not limited to only using the identity of the sender extracted from an X.509v3 to validate an N32-c identity of a sender. The X.509v3 certificate format is defined in IETF RFC 3280. According to IETF RFC 3280, one extension or parameter that may be included in an X.509v3 certificate is the subject alternative names extension. The subject alternative names extension is defined as follows:

The subject alternative names extension allows additional identities to be bound to the subject of the certificate. Defined options include an Internet electronic mail address, a DNS name, an IP address, and a uniform resource identifier (URI). Other options exist, including completely local definitions. Multiple name forms, and multiple instances of each name form, MAY be included. Whenever such identities are to be bound into a certificate, the subject alternative name (or issuer alternative name) extension MUST be used; however, a DNS name MAY be represented in the subject field using the domainComponent attribute as described in section 4.1.2.4.

Because the subject alternative name is considered to be definitively bound to the public key, all parts of the subject alternative name MUST be verified by the CA.

In some embodiments, as indicated above, a subject alternative names extension of an X.509v3 certificate may contain a DNS name, IP address, or a URI that identifies the subject of the certificate and that is verified by the certificate authority. Because the subject alternative name is verified by the certificate authority, the subject alternative name is difficult to spoof.

Referring to FIG. 4, in step 401, a ClientHello message for initiating a TLS handshake may be sent from SEPP 200 to SEPP 126.

In step 402, e.g., in response a ClientHello message, various handshake related messages (e.g., a ServerHello message, a Certificate message, a ServerKeyExchange message, a CertificateRequest message, and a ServerHelloDone message) may be sent from SEPP 126 to SEPP 200.

In step 403, e.g., in response to ServerHelloDone message, various handshake related messages (e.g., a Certificate message, a ClientKeyExchange message, a CertificateVerify message, a ChangeCipherSpec message, and a Finished message) may be sent from SEPP 200 to SEPP 126.

In step 404, a client related identifier from a Certificate message may be extracted and stored, e.g., data storage 306. For example, SEPP 126 or RLM 304 therein may extract or derive a relevant identifier from an FQDN stored in an X.509v3 certificate of a Certificate message. In this example, the FQDN may include or represent a network node identifier or a network identifier, e.g., the network identifier may be stored in a format like "5gc.mnc<MNC>.mcc<MCC>.3gppnetwork.org", where "<MNC>" and "<MCC>" fields correspond to the MNC and MCC of an operator's PLMN.

In step 405, e.g., in response a Finished message, various handshake related messages (e.g., a ChangeCipherSpec message, and a Finished message) may be sent from SEPP 126 to SEPP 200.

In step 406, after identifying a client related identifier (e.g., PLMN ID) associated with an N32-f interface connection, SEPP 126 or RLM 304 therein may monitor inter-PLMN messages (e.g., HTTP/2 messages) received via the N32-f interface connection for ingress message rate limiting purposes. For example, when an HTTP/2 request message associated with a particular PLMN ID is received via an N32-f interface connection, SEPP 126 or RLM 304 therein may determine whether a current message rate associated with the client related identifier meets or exceeds an allowed message rate associated with the client related identifier before processing, forwarding, and/or responding to the inter-PLMN messages.

It will be appreciated that FIG. 4 is for illustrative purposes and that different and/or additional messages and/or actions may be used. It will also be appreciated that various messages and/or actions described herein may occur in a different order or sequence.

FIG. 5 is a diagram that depicts example message rate related data 500. Data 500 may include information for identifying a current message rate, an allowed message rate, and/or a message throttle rate for various PLMNs or network nodes therein. For example, each rate in data 500 may represent a number of messages, requests, or transactions per a time period, e.g., transactions per second (TPS).

Referring to FIG. 5, a table representing data 500 comprises columns and/or fields for network and/or node IDs, current message rates, allowed message rates, and message throttle rate. A NET ID field may store information for representing a PLMN. An example network ID may include a PLMN identifier, a mobile country code (MCC) a mobile network code (MNC), a location area code (LAC), a network identifier, a cell global identifier (CGI), a base station identifier (BSID), an access node identifier, a cell identity (CI), a service area code (SAC), a routing area identity (RAI), a routing area code (RAC), a tracking area identity (TAI), a tracking area code (TAC), an eUTRAN CGI (EGCI), location coordinates (e.g., global positioning system (GPS) information), and/or relative location information. An example node ID may include a FQDN, a URI, a domain name system (DNS) name, or an IP address.

A current message rate field may store information for representing a measured or tracked message rate associated with one or more messages, types of messages, or transactions. For example, a current message rate (e.g., 50 TPS) may indicate a measured rate of inter-PLMN request messages or transactions received from a particular PLMN.

An allowed message rate field may store information for representing a predetermined allowed message rate associated with one or more messages, types of messages, or transactions. For example, an allowed message rate (e.g., 40 TPS) may indicate a rate of inter-PLMN request messages or transactions from a particular PLMN that SEPP 126 is configured to allow, e.g., without performing a rate limiting action.

A message throttle rate field may store information for representing a message throttle rate associated with one or more messages, types of messages, or transactions. For example, a message throttle rate may indicate a rate of inter-PLMN request messages or transactions from a particular PLMN that SEPP 126 is to throttle or discard. In this example, a throttle rate may based on the difference between a current message rate and an allowed message rate, e.g., 50 TPS−40 TPS=10 TPS.

It will also be appreciated that data 500 is for illustrative purposes and that different and/or additional data than the data depicted in FIG. 5 may be usable for indicating default values for particular data portions or other information. Further, data 500 may be stored (e.g., in data storage 306) or managed using various data structures and/or computer readable media.

Figure 6:
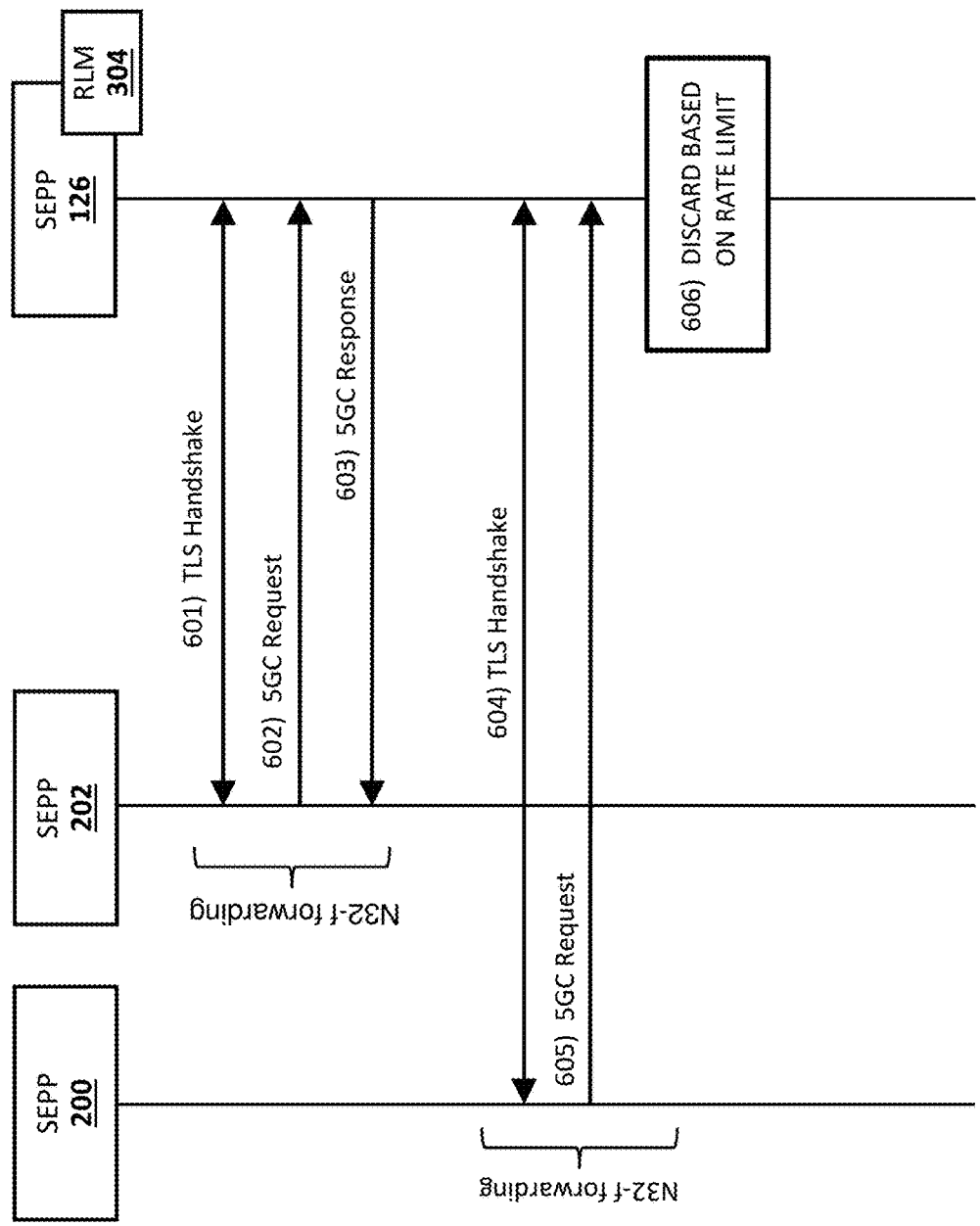
FIG. 6 is a message flow diagram illustrating an example of ingress message rate limiting.

FIG. 6 is a message flow diagram illustrating an example of ingress message rate limiting. In some embodiments, SEPP 126 or RLM 304 therein may be configured to perform ingress message rate limiting using an identifier associated with an initiating SEPP obtained or derived from a TLS based certificate exchanged when setting up or configuring an N32-f interface connection. After identifying a sender identifier (e.g., PLMN ID) associated with an N32-f interface connection, SEPP 126 or RLM 304 therein may monitor ingress inter-PLMN messages (e.g., an HTTP/2 messages) associated with the sender identifier and may determine whether a current message rate associated with the sender identifier meets or exceeds an allowed message rate associated with the sender identifier before processing, forwarding, and/or responding to the inter-PLMN messages. If SEPP 126 or RLM 304 determines that the current message rate meets or exceeds the allowed message rate, then SEPP 126 or RLM 304 therein may discard one or more of the inter-PLMN messages or may perform another rate limiting action. If SEPP 126 or RLM 304 therein determines that the current message rate does not meet or exceed the allowed message rate, then SEPP 126 or RLM 304 therein may allow the inter-PLMN messages.

Referring to FIG. 6, in step 601, a TLS handshake between SEPP 202 and SEPP 126 may occur via an N32-c interface. For example, SEPP 202 may initiate a TLS handshake with SEPP 126 and, during the TLS handshake, SEPP 202 and SEPP 126 may exchange digital certificates (e.g., X.509v3 certificate) containing identifiers.

In some embodiments, during a TLS handshake, SEPP 126 or RLM 304 therein may receive a digital certificate containing a identity associated with SEPP 202. In such embodiments, SEPP 126 or RLM 304 therein may extract, derive, or otherwise determine an identifier from the digital certificate and use that identifier for ingress message rate limiting functions.

In step 602, after the TLS handshake, an 5GC request (e.g., an HTTP/2 message) may be sent from SEPP 202 to SEPP 126 via an N32-f interface using a TLS protection mode. For example, a producer NF in a foreign network may generate an 5GC request that is forwarded to a consumer NF in another network via SEPP 202 and SEPP 126.

In step 603, e.g., after determining that rate limiting is not to be performed, an 5GC response (e.g., an HTTP/2 message) may be sent from SEPP 126 to SEPP 202 via the N32-f interface. For example, a consumer NF in a home network may generate an 5GC response that is forwarded to a producer NF in a foreign network via SEPP 126 and SEPP 202.

In step 604, a TLS handshake between SEPP 200 and SEPP 126 may occur via an N32-c interface For example, SEPP 200 may initiate a TLS handshake with SEPP 126 and, during the TLS handshake, SEPP 200 and SEPP 126 may exchange digital certificates (e.g., X.509v3 certificate) containing identifiers.

In some embodiments, during a TLS handshake, SEPP 126 or RLM 304 therein may receive a digital certificate containing a identity associated with SEPP 200. In such embodiments, SEPP 126 or RLM 304 therein may extract, derive, or otherwise determine an identifier from the digital certificate and use that identifier for ingress message rate limiting purposes.

In step 605, after the TLS handshake, an 5GC request (e.g., an HTTP/2 message) may be sent from SEPP 200 to SEPP 126 via an N32-f interface using a TLS protection mode. For example, a producer NF in a foreign network may generate an 5GC request that is forwarded to a consumer NF in another network via SEPP 200 and SEPP 126.

In step 606, e.g., after determining that rate limiting is to be performed, the 5GC request may be discarded. For example, SEPP 126 or RLM 304 therein may prevent a consumer NF from receiving a 5GC request that was forwarded by SEPP 200.

It will be appreciated that FIG. 6 is for illustrative purposes and that different and/or additional messages and/or actions may be used. It will also be appreciated that various messages and/or actions described herein may occur in a different order or sequence.

Figure 7:
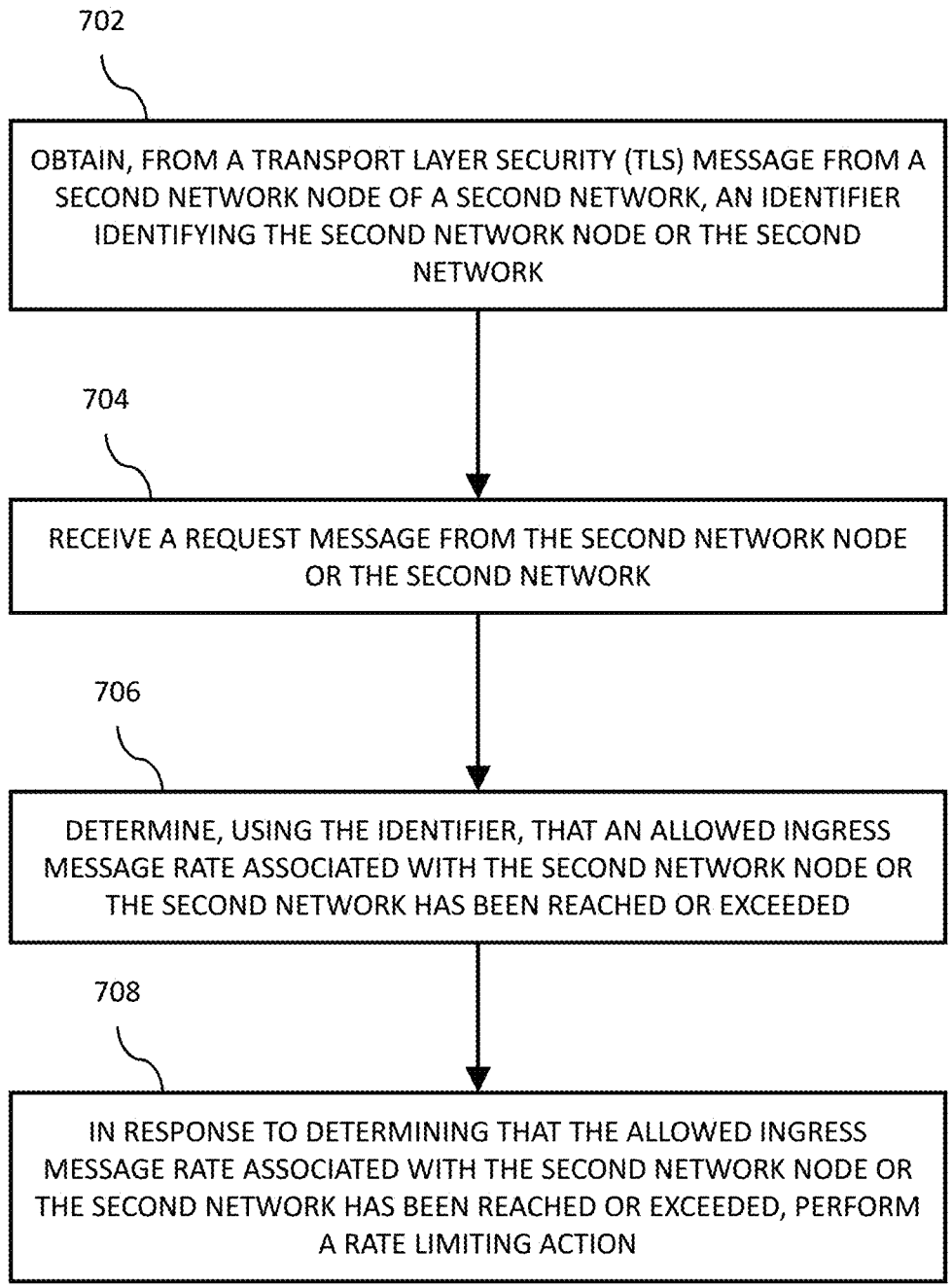
FIG. 7 is a flow chart illustrating an example process for ingress message rate limiting.

FIG. 7 is a diagram illustrating an example process 700 for ingress message rate limiting. In some embodiments, example process 700 described herein, or portions thereof, may be performed at or performed by node 300, RLM 304, and/or another module or node.

Referring to example process 700, aspects (e.g., processing steps or actions) may occur at a network node of a first network (e.g., SEPP 126 or node 300 comprising RLM 304 in a home 5GC network).

In step 702, an identifier identifying a second network node or a second network may be obtained from a TLS message from the second network node of the second network. For example, SEPP 200 of the 'MNO-1' network may initiate a TLS handshake with SEPP 126 in a home network and, during the TLS handshake, may provide a TLS message containing a certificate with an identifier associated with SEPP 200.

In some embodiments, obtaining an identifier from a TLS message may include obtaining the identifier from a certificate (e.g., an X.509v3 certificate) contained in the TLS message. For example, an X.509v3 certificate in a TLS message may include a subject field or a subject alternative name field that includes a FQDN associated with an identity of the sender. In this example, the FQDN may include or represent a network node identifier or a network identifier, e.g., the network identifier may be stored in a format like "5gc.mnc<MNC>.mcc<MCC>.3gppnetwork.org", where "<MNC>" and "<MCC>" fields correspond to the MNC and MCC of an operator's PLMN.

In step 704, a request message may be received from the second network node or the second network. For example, after a TLS handshake, SEPP 200 of the 'MNO-1' network may forward one or more 5GC requests (e.g., from a producer NF) to SEPP 126 in a home network via an N32-f interface using a TLS protection mode.

In step 706, it may be determined, using the identifier, that an allowed ingress message rate associated with the second network node or the second network has been reached or exceeded. For example, SEPP 126 may utilize an identifier associated with an initiating SEPP to determine whether the SEPP is reaching or exceeding an ingress message rate. In this example, SEPP 126 may query a data store or database that contains current ingress message rates and allowed message rates indexed by or associated with relevant identifiers (e.g., a PLMN identifier and/or a SEPP identifier).

In some embodiments, determining that an allowed ingress message rate associated with a second network node or a second network has been reached or exceeded may comprise obtaining the allowed ingress message rate associated with the second network node or the second network; obtaining a current ingress message rate associated with the second network node or the second network; and comparing the current ingress message rate and the allowed ingress message rate for determining that the current ingress message rate meets or exceeds the allowed ingress message rate.

In some embodiments, obtaining a current ingress message rate associated with a second network node or a second network may include tracking or deriving messages rates for a plurality of SEPPs in the second network to determine the current ingress rate associated with the second network. For example, assuming rate limiting is based on an originating network identifier, SEPP 126 may track ingress message rates across a plurality of N32-f interface connections and may combine ingress messages rates for a plurality of SEPPs associated with a same network identifier and may compare the combined ingress message rate associated with the network identifier to a predetermined allowed ingress message rate associated with the network identifier.

In step 708, in response to determining that the allowed ingress message rate associated with the second network node or the second network has been reached or exceeded, a rate limiting action may be performed.

In some embodiments, a rate limiting action may include discarding a request message, generating or modifying a throttle rate for discarding a portion of messages, or notifying a network operator or a management system.

It will be appreciated that process 700 is for illustrative purposes and that different and/or additional actions may be used. It will also be appreciated that various actions described herein may occur in a different order or sequence.

It will appreciated that while some aspects of the subject matter described herein has been discussed with reference to 5G networks various other networks may utilize some aspects of the subject matter described herein. For example, any network that utilize certificates that identify senders or related networks may use features, mechanisms and techniques described herein to perform more selective ingress message rate limiting, e.g., based on a source node or network.

It should be noted that node 300, RLM 304, and/or functionality described herein may constitute a special purpose computing device. Further, node 300, RLM 304, and/or functionality described herein can improve the technological field of network security and/or message rate limiting at a SEPP or other network node. For example, by performing ingress message rate limiting based on a network identifier and/or a node identifier, malicious activities (e.g., signaling traffic storms) and their negative consequences (e.g., network congestion, service failures, and/or poor user experience) can be mitigated and/or prevented.

The disclosure of each of the following references is incorporated herein by reference in its entirety to the extent not inconsistent herewith and to the extent that it supplements, explains, provides a background for, or teaches methods, techniques, and/or systems employed herein.

REFERENCES

1. IETF RFC 5246; The Transport Layer Security (TLS) Protocol, Version 1.2; August 2008
2. IETF RFC 3280; Internet X.509 Public Key Infrastructure Certificate and Certificate Revocation List (CRL) Profile, April 2002.
3. 3GPP TS 23.003; $3^{rd}$ Generation Partnership Project; Technical Specification Group Core Network and Terminals; Numbering, addressing and identification (Release 16), V16.4.0 (2020-09).
4. 3GPP TS 29.573; $3^{rd}$ Generation Partnership Project; Technical Specification Group Core Network and Terminals; 5G System; Public Land Mobile Network (PLMN) Interconnection; Stage 3 (Release 16) V16.3.0 (2020-07)
5. 3GPP TS 33.501; $3^{rd}$ Generation Partnership Project; Technical Specification Group Services and System Aspects; Security Architecture and Procedures for the 5G System; (Release 16), V16.3.0 (2020-07).
6. 3GPP TS 29.510; $3^{rd}$ Generation Partnership Project; Technical Specification Group Core Network and Terminals; 5G System; Network Function Repository Services; Stage 3 (Release 16), V16.4.0 (2020-07).

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for ingress message rate limiting, the method comprising:
    at a first security edge protection proxy (SEPP) of a first network:
       obtaining, from a transport layer security (TLS) message from a second SEPP of a second network, an identifier identifying the second SEPP or the second network, wherein the TLS message is sent during a TLS handshake associated with establishing an N32-f interface connection between the first SEPP and the second SEPP;
       receiving, via the N32-f interface connection, a request message from the second SEPP or the second network;
       determining, using the identifier, that an allowed ingress message rate associated with the second SEPP or the second network has been reached or exceeded, wherein determining the allowed ingress message rate includes querying a data store comprising allowed ingress message rates and associated identifiers; and
       in response to determining that the allowed ingress message rate associated with the second SEPP or the second network has been reached or exceeded, performing a rate limiting action.

2. The method of claim 1 wherein obtaining the identifier from the TLS message includes obtaining the identifier from a certificate contained in the TLS message.

3. The method of claim 2 wherein the certificate comprises an X.509 certificate.

4. The method of claim 3 wherein obtaining the identifier includes extracting a fully qualified domain name (FQDN) for the second SEPP from a subject field or a subject alternative name field of the X.509 certificate.

5. The method of claim 4 wherein obtaining the identifier includes obtaining a network identifier from the FQDN for identifying the second network.

6. The method of claim 1 wherein determining that the allowed ingress message rate associated with the second SEPP or the second network has been reached or exceeded comprises:
    obtaining the allowed ingress message rate associated with the second SEPP or the second network;
    obtaining a current ingress message rate associated with the second SEPP or the second network; and
    comparing the current ingress message rate and the allowed ingress message rate for determining that the current ingress message rate meets or exceeds the allowed ingress message rate.

7. The method of claim 6 wherein obtaining the current ingress message rate associated with the second SEPP or the second network includes tracking or deriving a combined messages rate for a plurality of SEPPs in the second network to determine the current ingress rate associated with the second network.

8. The method of claim 1 wherein the rate limiting action includes discarding the request message, generating or modifying a throttle rate for discarding a portion of ingress messages, or notifying a network operator or a management system.

9. A system for ingress message rate limiting, the system comprising:
a first security edge protection proxy (SEPP) of a first network comprising:
at least one processor; and
a memory,
wherein the first SEPP is configured for:
obtaining, from a transport layer security (TLS) message from a second SEPP of a second network, an identifier identifying the second SEPP or the second network;
receiving a request message from the second SEPP or the second network;
determining, using the identifier, that an allowed ingress message rate associated with the second SEPP or the second network has been reached or exceeded, wherein determining the allowed ingress message rate includes querying a data store comprising allowed ingress message rates and associated identifiers; and
in response to determining that the allowed ingress message rate associated with the second SEPP or the second network has been reached or exceeded, performing a rate limiting action.

10. The system of claim 9 wherein the first SEPP is configured for obtaining the identifier from the TLS message by obtaining the identifier from a certificate contained in the TLS message.

11. The system of claim 10 wherein the certificate comprises an X.509 certificate.

12. The system of claim 11 wherein the first SEPP is configured for extracting a fully qualified domain name (FQDN) for the second SEPP from a subject field or a subject alternative name field of the X.509 certificate.

13. The system of claim 12 wherein the first SEPP is configured for obtaining a network identifier from the FQDN for identifying the second network.

14. The system of claim 9 wherein the first SEPP is configured for:
obtaining the allowed ingress message rate associated with the second SEPP or the second network;
obtaining a current ingress message rate associated with the second SEPP or the second network; and
comparing the current ingress message rate and the allowed ingress message rate for determining that the current ingress message rate meets or exceeds the allowed ingress message rate.

15. The system of claim 14 wherein the first SEPP is configured for tracking or deriving messages rates for a plurality of SEPPs in the second network to determine the current ingress rate associated with the second network.

16. The system of claim 9 wherein the rate limiting action includes discarding the request message, generating or modifying a throttle rate for discarding a portion of ingress messages, or notifying a network operator or a management system.

17. A non-transitory computer readable medium having stored thereon executable instructions that when executed by a processor of a computer control the computer to perform steps comprising:
at a first security edge protection proxy (SEPP) of a first network:
obtaining, from a transport layer security (TLS) message from a second SEPP of a second network, an identifier identifying the second SEPP or the second network;
receiving a request message from the second SEPP or the second network;
determining, using the identifier, that an allowed ingress message rate associated with the second SEPP or the second network has been reached or exceeded, wherein determining the allowed ingress message rate includes querying a data store comprising allowed ingress message rates and associated identifiers; and
in response to determining that the allowed ingress message rate associated with the second SEPP or the second network has been reached or exceeded, performing a rate limiting action.

18. The non-transitory computer readable medium of claim 17 wherein obtaining the identifier from the TLS message includes obtaining the identifier from a certificate contained in the TLS message.

* * * * *

UNITED STATES PATENT AND TRADEMARK OFFICE
CERTIFICATE OF CORRECTION

PATENT NO. : 11,528,251 B2
APPLICATION NO. : 17/129487
DATED : December 13, 2022
INVENTOR(S) : Rajput et al.

It is certified that error appears in the above-identified patent and that said Letters Patent is hereby corrected as shown below:

On the Title Page

On page 2, Column 1, under item (56) U.S. Patent Documents, Line 60, below "2003/0087647 A1 5/2003 Hurst" insert -- US-2004/0140908 A1 07-22-2004 Gladwin et al. --, therefor.

On page 3, Column 2, under item (56) U.S. Patent Documents, Line 11, delete "Goel et al." and insert -- Goel --, therefor.

On page 3, Column 2, under item (56) Foreign Patent Documents, Line 50, delete "ZA" and insert -- ZL --, therefor.

On page 7, Column 1, under item (56) Other Publications, Line 25, delete ""Digitial" and insert -- "Digital --, therefor.

On page 7, Column 1, under item (56) Other Publications, Line 51, delete "Monile" and insert -- Mobile --, therefor.

On page 7, Column 1, under item (56) Other Publications, Line 52, delete "Stagel" and insert -- Stage1 --, therefor.

On page 7, Column 2, under item (56) Other Publications, Line 29, delete "Internatioanl" and insert -- International --, therefor.

Signed and Sealed this
Fifteenth Day of August, 2023

Katherine Kelly Vidal
*Director of the United States Patent and Trademark Office*